US012597609B2

(12) United States Patent
Liu et al.

(10) Patent No.: US 12,597,609 B2
(45) Date of Patent: Apr. 7, 2026

(54) POSITIVE ELECTRODE PLATE, SECONDARY BATTERY AND POWER CONSUMING DEVICE

(71) Applicant: CONTEMPORARY AMPEREX TECHNOLOGY (HONG KONG) LIMITED, Hong Kong (CN)

(72) Inventors: Huihui Liu, Fujian (CN); Lingyun Feng, Fujian (CN); Yanhuang Fan, Fujian (CN); Wenmeng Zhang, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 246 days.

(21) Appl. No.: 18/222,503

(22) Filed: Jul. 17, 2023

(65) Prior Publication Data

US 2023/0420677 A1 Dec. 28, 2023

Related U.S. Application Data

(63) Continuation of application No. PCT/CN2022/084385, filed on Mar. 31, 2022.

(51) Int. Cl.
*H01M 4/58* (2010.01)
*H01M 4/36* (2006.01)
(Continued)

(52) U.S. Cl.
CPC ......... *H01M 4/5825* (2013.01); *H01M 4/366* (2013.01); *H01M 4/505* (2013.01);
(Continued)

(58) Field of Classification Search
CPC ...... H01M 4/622; H01M 4/366; H01M 4/505; H01M 4/5825; H01M 4/583;
(Continued)

(56) References Cited

U.S. PATENT DOCUMENTS

2013/0209886 A1 8/2013 Ohira et al.
2016/0190584 A1* 6/2016 Wu .................... H01M 4/5825 252/182.1

FOREIGN PATENT DOCUMENTS

CN 103069624 A 4/2013
CN 106058225 A 10/2016
(Continued)

OTHER PUBLICATIONS

Intention to Grant issued Mar. 3, 2025 in European Patent Application No. 22 917 641.7 including Text intended for grant.
(Continued)

*Primary Examiner* — Laura Weiner
(74) *Attorney, Agent, or Firm* — XSENSUS LLP

(57) ABSTRACT

The present application provides a positive electrode plate, a secondary battery and a power consuming device. The positive electrode plate may comprise a positive electrode current collector, a positive electrode film layer provided on at least one surface of the positive electrode current collector, and a conductive undercoat layer between the positive electrode current collector and the positive electrode film layer, wherein the positive electrode film layer may include a positive electrode film layer comprising a positive electrode active material with a core-shell structure, the positive electrode active material may comprise an inner core and a shell coating the inner core, and the conductive primer layer may comprise a first polymer, a first water-based binder and a first conductive agent.

15 Claims, 5 Drawing Sheets

(51) Int. Cl.
*H01M 4/505* (2010.01)
*H01M 4/583* (2010.01)
*H01M 4/62* (2006.01)
*H01M 4/02* (2006.01)
*H01M 10/0525* (2010.01)

(52) U.S. Cl.
CPC ........... *H01M 4/583* (2013.01); *H01M 4/622* (2013.01); *H01M 4/625* (2013.01); *H01M 2004/028* (2013.01); *H01M 10/0525* (2013.01); *H01M 2220/20* (2013.01)

(58) Field of Classification Search
CPC ........... H01M 2004/028; H01M 4/625; H01M 2004/021; H01M 10/0525
See application file for complete search history.

(56) References Cited

FOREIGN PATENT DOCUMENTS

| | | | |
|---|---|---|---|
| CN | 106816600 | A | 6/2017 |
| CN | 109301174 | A | 2/2019 |
| CN | 110431697 | A | 11/2019 |
| CN | 112420998 | A | 2/2021 |
| CN | 114174384 | A | 3/2022 |
| JP | H11-73943 | A | 3/1999 |
| JP | 2014-056722 | A | 3/2014 |

OTHER PUBLICATIONS

Extended European Search Report issued Mar. 11, 2024 in European Patent Application No. 22917641.7.

Zhao, De, et al., "Synthesis of B Doped Li1+2xMn0.8Fe0.2P1-xBxO4 as Cathode Material for Lithium Ion Battery", Journal of the Chinese Ceramic Society, vol. 45, No. 1, Jan. 1, 2017 (English abstract included).

International Search Report and Written Opinion mailed on Dec. 28, 2023, received for PCT Application PCT/CN2022/084385, filed on Mar. 31, 2022, 15 pages including English Translation.

Notification to Grant Patent Right for Invention issued Nov. 19, 2025 in Chinese Patent Application No. 202280050821.9 with English translation thereof.

* cited by examiner

POSITIVE ELECTRODE PLATE, SECONDARY BATTERY AND POWER CONSUMING DEVICE

CROSS-REFERENCE TO RELATED APPLICATION

The present application is a continuation of International Application No. PCT/CN2022/084385, filed Mar. 31, 2022, which is incorporated herein by reference in its entirety.

TECHNICAL FIELD

The present application relates to the technical field of batteries, and in particular to a positive electrode plate, a secondary battery and a power consuming device.

BACKGROUND ART

In recent years, with the increasing application range, secondary batteries are widely used in energy storage power systems such as hydraulic power, thermal power, wind power and solar power stations, as well as many fields such as electric tools, electric bicycles, electric motorcycles, electric vehicles, military equipment, and aerospace. Due to the great development of secondary batteries, higher requirements have also been placed on the secondary batteries in terms of energy density, cycling performance, etc.

In the related art, a conductive undercoat layer is provided between the active material of the positive electrode plate and the current collector to improve one or more performances of the secondary battery.

In order to further improve the performance of the battery, a better positive electrode plate is required in the prior art.

SUMMARY OF THE DISCLOSURE

In view of the above consideration, the present application provides a new positive electrode plate, a secondary battery and a power consuming device. The new positive electrode plate comprises a new positive electrode active material and a new conductive undercoat layer, which will be described respectively below.

In a first aspect, the present application provides a positive electrode plate, comprising a positive electrode current collector, a positive electrode film layer provided on at least one surface of the positive electrode current collector, and a conductive undercoat layer between the positive electrode current collector and the positive electrode film layer, wherein the positive electrode film layer comprises a positive electrode active material with a core-shell structure; the positive electrode active material comprises an inner core and a shell coating the inner core;

the inner core includes $Li_{1+x}Mn_{1-y}A_yP_{1-z}R_zO_4$, where x=−0.100 to 0.100, y=0.001 to 0.500, z=0.001 to 0.100; A is selected from one or more of Zn, Al, Na, K, Mg, Mo, W, Ti, V, Zr, Fe, Ni, Co, Ga, Sn, Sb, Nb and Ge, optionally one or more of Fe, Ti, V, Ni, Co and Mg; and R is selected from one or more of B, Si, N and S;

the shell includes a first coating layer coating the inner core and a second coating layer coating the first coating layer, wherein the first coating layer includes pyrophosphate of $MP_2O_7$ and phosphate of $XPO_4$, wherein M and X are each independently selected from one or more of Li, Fe, Ni, Mg, Co, Cu, Zn, Ti, Ag, Zr, Nb or Al; and the second coating layer includes carbon; and the conductive undercoat layer includes a first polymer, a first water-based binder, and a first conductive agent, wherein the first polymer comprises a first monomer unit represented by formula 1;

a second monomer unit selected from at least one of a group consisting of a monomer unit represented by formula 2 and a monomer unit represented by formula 3;

a third monomer unit selected from at least one of a group consisting of a monomer unit represented by formula 4 and a monomer unit represented by formula 5; and a fourth monomer unit represented by formula 6, in which $R^1$, $R^2$, and $R^3$ each independently represent H, a carboxyl, an ester group, and groups of substituted or unsubstituted C1-C10 alkyl, C1-C10 alkoxy, C2-C10 alkenyl, and C6-C10 aryl, and $R^4$ represents H, and groups of substituted or unsubstituted C1-C10 alkyl, C1-C10 alkoxy, C2-C10 alkenyl, and C6-C10 aryl;

formula 1

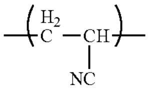

formula 2

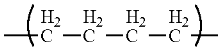

formula 3

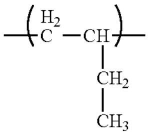

formula 4

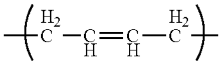

formula 5

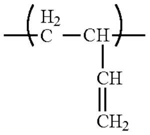

formula 6

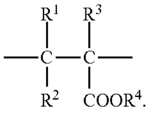

In some embodiments, based on the total mass of the first polymer, the mass percentage content of the first monomer unit is M1, and M1 is 10%-55%, optionally 25%-55%; and/or the mass percentage content of the second monomer unit is M2, and M2 is 40%-80%, optionally 50%-70%; and/or the mass percentage content of the third monomer unit is M3, and M3 is 0%-10%, optionally 0.001%-2%; and/or the mass percentage content of the fourth monomer unit is M4, and M4 is 0%-10%, optionally 0.1%-1%.

In some embodiments, M3/(M2+M3) is 0%-5%, optionally 0.001%-1%.

In some embodiments, the first polymer includes one or more selected from hydrogenated nitrile rubbers, and hydrogenated carboxylated nitrile rubbers; and/or, the weight-average molecular weight of the first polymer is 50,000-1,500,000, optionally 200,000-400,000.

In some embodiments, the first water-based binder includes one or more selected from a water-based polyacrylic resin and a derivative thereof, a water-based amino-modified polypropylene resin and a derivative thereof, and a polyvinyl alcohol and a derivative thereof, optionally a water-based acrylic acid-acrylate copolymers; and/or, the first water-based binder has a weight-average molecular weight of 200,000-1,500,000, optionally 300,000-400,000.

In some embodiments, the first conductive agent includes one or more selected from superconductive carbon, conductive graphite, acetylene black, carbon black, Ketj en black, carbon dots, carbon nanotubes, graphene, and carbon nanofibers, optionally one or more selected from carbon nanotubes, graphene, and carbon nanofibers.

In some embodiments, based on the total mass of the conductive undercoat layer,

- the mass percentage content of the first polymer is X1, and X1 is 5%-20%, optionally 5%-10%; and/or
- the mass percentage content of the first water-based binder is X2, and X2 is 30%-80%, optionally 40%-50%; and/or
- the mass percentage content of the first conductive agent is X3, and X3 is 10%-50%, optionally 40%-50%.

In some embodiments, the conductive undercoat layer has a thickness of 1 μm-20 μm, optionally 3 μm-10 μm.

In some embodiments, the positive electrode film layer further includes one or more selected from an infiltration agent and a dispersant, optionally, the positive electrode film layer further includes both an infiltration agent and a dispersant.

In some embodiments, the infiltration agent has a surface tension of 20 mN/m-40 mN/m, and optionally, the infiltration agent includes at least one of the functional groups of: —CN, —$NH_2$, —NH—, —N—, —OH, —COO—, and —C(═O)—O—C(═O)—.

In some embodiments, the infiltration agent includes one or more selected from a small molecule organic solvent and a low molecular weight polymer, and

- optionally, the small molecule organic solvent includes one or more selected from an alcohol amine compound, an alcohol compound, and a nitrile compound, and optionally, the alcohol amine compound has a number of carbon atom of 1-16, optionally 2-6; and
- optionally, the low molecular weight polymer includes one or more selected from a maleic anhydride-styrene copolymer, polyvinylpyrrolidone, and polysiloxane, and optionally, the low molecular weight polymer has a weight-average molecular weight of no more than 6000, optionally 3000-6000.

In some embodiments, the dispersant includes a second polymer, and the second polymer comprises:

- a fifth monomer unit represented by formula 7;
- a sixth monomer unit selected from at least one of a group consisting of a monomer unit represented by formula 8 and a monomer unit represented by formula 9; and
- a seventh monomer unit selected from at least one of a group consisting of a monomer unit represented by formula 10 and a monomer unit represented by formula 11;

formula 7

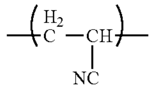

formula 8

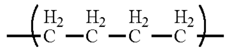

formula 9

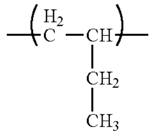

formula 10

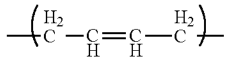

formula 11

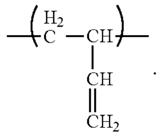

.

In some embodiments, based on the total mass of the second polymer,

- the mass percentage content of the fifth monomer unit is M5, and M5 is 10%-55%, optionally 25%-55%; and/or
- the mass percentage content of the sixth monomer unit is M6, and M6 is 40%-80%, optionally 50%-70%; and/or
- the mass percentage content of the seventh monomer unit is M7, and M7 is 0%-10%, optionally 0.001%-2%.

In some embodiments, M7/(M6+M7) is 0%-5%, optionally 0.001%-1%. In some embodiments, the second polymer is a hydrogenated nitrile rubber; and/or the second polymer has a weight-average molecular weight of 50,000-500,000, optionally 150,000-350,000.

In some embodiments, based on the total mass of the positive electrode film layer, the mass percentage content of the dispersant is Y1, and Y1 is 0.05%-1%, optionally 0.1%-0.5%; and/or the mass percentage content of the infiltration agent is Y2, and Y2 is 0.05%-2%, optionally 0.2%-0.8%.

In some embodiments, Y1/Y2 is 0.05-20, optionally 0.1-1, further 0.3-0.8.

In some embodiments, in the positive electrode plate, the mass ratio of the first polymer to the second polymer is 1.5-5, optionally 2-3.

In some embodiments, the first coating layer has an interplanar spacing of the phosphate of 0.345-0.358 nm, and an angle of the crystal direction (111) of 24.25°-26.45°; and the first coating layer has an interplanar spacing of the pyrophosphate of 0.293-0.326 nm, and an angle of the crystal direction (111) of 26.41°-32.57°.

In some embodiments, in the inner core, the ratio of y to 1-y is 1:10 to 10:1, optionally 1:4 to 1:1; and/or, in the inner core, the ratio of z to 1-z is 1:9 to 1:999, optionally 1:499 to 1:249.

In some embodiments, the coating amount of the first coating layer is greater than 0 wt % and less than or equal to 7 wt %, optionally 4-5.6 wt %, based on the weight of the inner core.

In some embodiments, the weight ratio of the pyrophosphate to phosphate in the first coating layer is 1:3 to 3:1, optionally 1:3 to 1:1.

In some embodiments, the pyrophosphate and the phosphate each independently have a crystallinity of 10% to 100%, optionally 50% to 100%.

In some embodiments, the coating amount of the second coating layer is greater than 0 wt % and less than or equal to 6 wt %, optionally 3-5 wt %, based on the weight of the inner core.

In some embodiments, A is selected from at least two of Fe, Ti, V, Ni, Co and Mg.

In some embodiments, the Li/Mn antisite defect concentration of the positive electrode active material is 4% or less, optionally 2% or less.

In any embodiment, a lattice change rate of the positive electrode active material is no more than 6%, optionally no more than 4%.

In some embodiments, the surface oxygen valence state of the positive electrode active material is no more than −1.88, optionally −1.98 to −1.88.

In some embodiments, the compacted density of the positive electrode active material under 3 tons is no less than 2.0 g/$cm^3$, optionally no less than 2.2 g/$cm^3$.

In some embodiments, the positive electrode active material has a specific surface area of 15 $m^2$/g-25 $m^2$/g, and the coating weight on one side of the positive electrode current collector is 20 mg/$cm^2$-40 mg/$cm^2$. When the positive electrode active material has a specific surface area of 15 $m^2$/g-25 $m^2$/g, and the coating weight on one side of the positive electrode current collector is 20 mg/$cm^2$-40 mg/$cm^2$, the film peeling phenomenon easily occurs during the coating process. In the present application, a new conductive undercoat layer is used to increase the bonding strength between the positive electrode active material layer and the current collector.

In a second aspect, the present application provides a secondary battery, including the positive electrode plate described in any one of the above embodiments.

In a third aspect, the present application provides a power consuming device, including the above secondary battery.

The positive electrode active material with a core-shell structure provided in the present application comprises an inner core and a shell coating the inner core, wherein the inner core includes $Li_{1+x}Mn_{1-y}A_yP_{1-z}R_zO_4$, wherein x=−0.100-0.100, and for example, x may be 0.006, 0.004, 0.003, 0.002, 0.001, 0, −0.001, −0.003, −0.004, −0.005, −0.006, −0.007, −0.008, −0.009, and −0.10; y=0.001-0.500, and for example, y may be 0.1, 0.2, 0.25, 0.3, 0.35, 0.4, and 0.45; z=0.001-0.100, and for example, z may be 0.001, 0.002, 0.003, 0.004, 0.006, 0.007, 0.008, 0.009, and 0.1; A is selected from one or more of Zn, Al, Na, K, Mg, Mo, W, Ti, V, Zr, Fe, Ni, Co, Ga, Sn, Sb, Nb and Ge, optionally one or more of Fe, Ti, V, Ni, Co and Mg, and R is selected from one or more of B, Si, N and S; and the shell includes a first coating layer coating the inner core and a second coating layer coating the first coating layer, wherein the first coating layer includes pyrophosphate of $MP_2O_7$ and phosphate of $XPO_4$, in which M and X are each independently selected from one or more of Li, Fe, Ni, Mg, Co, Cu, Zn, Ti, Ag, Zr, Nb or Al; and the second coating layer includes carbon.

Unless otherwise stated, in the above chemical formula, when A is a combination of at least two elements, the above definition of the numerical range of y not only represents a definition of the stoichiometric number of each element as A, but also represents a definition of the sum of the stoichiometric numbers of the elements as A. For example, when A is a combination of at least two elements of A1, A2 . . . and An, the stoichiometric numbers y1, y2 . . . and yn of A1, A2 . . . and An each fall within the numerical range of y defined in the present application, and the sum of y1, y2 . . . and yn also falls within this numerical range. Similarly, when R is a combination of at least two elements, the definition of the numerical ranges of the stoichiometric numbers of R in the present application also has the above meanings.

The inventors of the present application have found in practical operations that: during the deep charge/discharge process, the lithium manganese phosphate positive electrode active material has relatively serious manganese dissolution. Although there are attempts in the prior art to coat lithium manganese phosphate with lithium iron phosphate to reduce interfacial side reactions, this coating cannot prevent the dissolved manganese from migrating into the electrolyte solution. The dissolved manganese is reduced to metal manganese after migrating to the negative electrode. The metal manganese thus produced is equivalent to a "catalyst", which can catalyze the decomposition of the SEI film (solid electrolyte interphase, solid electrolyte interphase film) on the surface of the negative electrode. Part of the by-products generated are gases, which can easily cause the battery to expand and affect the safety of the secondary battery, and the other part is deposited on the surface of the negative electrode, hindering the passage of lithium ions into and out of the negative electrode, causing the increased impedance of the secondary battery and affecting the kinetic performance of the battery. In addition, in order to supplement the lost SEI film, the electrolyte solution and the active lithium inside the battery are continuously consumed, which has an irreversible impact on the capacity retention rate of the secondary battery.

Through a lot of research, the present inventors found that for lithium manganese phosphate positive electrode active materials, the problems of severe manganese dissolution and high surface reactivity may be caused by the Jahn-Teller effect of $Mn^{3+}$ and the change of $Li^+$ channel size after delithiation. For this reason, the present inventors, by modifying lithium manganese phosphate, obtain a positive electrode active material which can significantly reduce manganese dissolution and reduce the lattice change rate and then has good cycling performance, high-temperature storage performance and safety performance.

As shown in FIG. 9, the lithium manganese phosphate positive electrode active material of the present application has a core-shell structure with two coating layers. The positive electrode active material comprises an inner core 91 and a shell coating the inner core, and the shell includes a first coating layer 92 coating the inner core and a second coating layer 93 coating the first coating layer 92. The inner core includes $Li_{1+x}Mn_{1-y}A_yP_{1-z}R_zO_4$. In the inner core, the element A doped at the manganese site of lithium manganese phosphate facilitates to reduce the lattice change rate of the lithium manganese phosphate during the processes of lithium intercalation and deintercalation, and improves the structural stability of the lithium manganese phosphate positive electrode material, greatly reducing the dissolution of manganese and reducing the oxygen activity on the particle surface. The element R doped at the phosphorus site facilitates to change the difficulty in changing the Mn—O bond length, thereby reducing the migration barrier of lithium ions, promoting the migration of lithium ions, and improving the rate performance of the secondary battery.

The first coating layer of the positive electrode active material of the present application includes pyrophosphate and phosphate. Due to the high migration barrier (>1 eV) of transition metals in pyrophosphate, the dissolution of the transition metals can be effectively inhibited. The phosphate has an excellent lithium ion conductivity, and can reduce the content of lithium impurities on the surface. In addition, since the second coating layer is a carbon-containing layer, the electrical conductivity and desolvation ability of $LiMnPO_4$ can be effectively improved. In addition, the "barrier" effect of the second coating layer can further hinder the migration of manganese ions into the electrolyte and reduce the corrosion of the active material by the electrolyte.

Therefore, the present application, by specific element doping and surface coating on lithium manganese phosphate, can effectively inhabit the dissolution of Mn in the process of lithium intercalation-deintercalation, and at the same time promote the migration of lithium ions, thereby improving the rate performance of the battery cell and increasing the cycling performance and high temperature performance of the secondary battery.

FIG. 10 shows the comparison of the XRD spectrum of example 1-1 of the present application before coating the first coating layer and the second coating layer with the standard XRD spectrum of lithium manganese phosphate (00-033-0804). It should be pointed out that, as shown in FIG. 10, by comparing the XRD spectra before and after doping $LiMnPO_4$ in the present application, it can be seen that the positions of the main characteristic peaks of the positive electrode active material in the present application is basically consistent with those before doping $LiMnPO_4$, indicating that doped lithium manganese phosphate positive electrode active material has no impurity phase, and the improvement of the performance of the secondary battery mainly results from element doping, not the impurity phase.

In some embodiments, optionally the first coating layer has an interplanar spacing of the phosphate of 0.345-0.358 nm, and an angle of the crystal direction (111) of 24.25°-26.45°; and the first coating layer has an interplanar spacing of the pyrophosphate of 0.293-0.326 nm, and an angle of the crystal direction (111) of 26.41°-32.57°.

When the interplanar spacing and angle of the crystal direction (111) of the phosphate and pyrophosphate in the first coating layer are in the above range, the impurity phase in the coating layer can be effectively avoided, thereby increasing the gram capacity of the material, the cycling performance and rate performance.

In some embodiments, optionally, in the inner core, the ratio of y to 1-y is 1:10 to 10:1, optionally 1:4 to 1:1. Here, y denotes the sum of the stoichiometric numbers of the Mn-site doping elements. When the above conditions are satisfied, the energy density and cycling performance of the positive electrode active material can be further improved.

In some embodiments, optionally, in the inner core, the ratio of z to 1-z is 1:9 to 1:999, optionally 1:499 to 1:249. Here, y denotes the sum of the stoichiometric numbers of the P-site doping elements. When the above conditions are satisfied, the energy density and cycling performance of the positive electrode active material can be further improved.

In some embodiments, optionally, the coating amount of the first coating layer is greater than 0 wt % and less than or equal to 7 wt %, optionally 4-5.6 wt %, based on the weight of the inner core.

When the coating amount of the first coating layer is within the above range, the dissolution of manganese can be further inhibited, and at the same time, the transport of lithium ions can be further promoted. Also, the following situations can be effectively avoided: If the coating amount of the first coating layer is too low, insufficient inhibition of manganese dissolution by pyrophosphate may be caused, and the improvement of lithium ion transport performance is not significant; and if the coating amount of the first coating layer is too high, a too thick coating layer may be caused, the impedance of the battery is increased, and the kinetic performance of the battery is affected.

In some embodiments, optionally, the weight ratio of the pyrophosphate to phosphate in the first coating layer is 1:3 to 3:1, optionally 1:3 to 1:1.

The appropriate ratio of pyrophosphate to phosphate facilitates the synergistic effect of the two salts. Also, the following situations can be effectively avoided: If there is too much pyrophosphate and too little phosphate, the increased battery impedance may be caused; and if there is too much phosphate and too little pyrophosphate, the effect of inhibiting manganese elution is not significant.

In some embodiments, optionally, the pyrophosphate and the phosphate each independently have a crystallinity of 10% to 100%, optionally 50% to 100%.

In the first coating layer of the lithium manganese phosphate positive electrode active material of the present application, the pyrophosphate and phosphate with a certain degree of crystallinity are beneficial to keeping the structural stability of the first coating layer, reducing the lattice defects. For one thing, this is conducive to the exertion of the pyrophosphate in hindering the dissolution of manganese; for another thing, this is also beneficial to reducing the surface lithium content and the surface oxygen valence state of phosphate, thereby reducing the interface side reactions between the positive electrode material and the electrolyte solution, reducing the consumption of electrolyte solution, and improving the cycling performance and safety performance of the battery.

It should be noted that, in the present application, the crystallinity of the pyrophosphate and phosphate can be adjusted, for example, by adjusting the process conditions of the sintering process, such as the sintering temperature, and sintering time. The crystallinity of the pyrophosphate and phosphate can be measured by methods known in the art, such as by X-ray diffraction, density, infrared spectroscopy, differential scanning calorimetry, and nuclear magnetic resonance absorption methods.

In some embodiments, optionally, the coating amount of the second coating layer is greater than 0 wt % and less than or equal to 6 wt %, optionally 3-5 wt %, based on the weight of the inner core.

The carbon-containing layer as the second coating layer can function as a "barrier" to avoid the direct contact between the positive electrode active material and the electrolyte solution, thereby reducing the corrosion of the active material by the electrolyte solution and improving the safety performance of the battery at high temperatures. Moreover, it has strong electrical conductivity, which can reduce the internal resistance of the battery, thereby improving the kinetic performance of the battery. However, since the gram capacity of the carbon material is low, when the amount of the second coating layer is too high, the gram capacity of the entire positive electrode active material may be reduced. Thus, when the coating amount of the second coating layer is in the above range, the kinetic performance and safety performance of the battery can be further improved without compromising the gram capacity of the positive electrode active material.

In some embodiments, optionally, A is selected from at least two of Fe, Ti, V, Ni, Co and Mg.

Simultaneously doping two or more of the above elements onto the manganese site in the lithium manganese phosphate positive electrode active material is beneficial to an enhanced doping effect. For one thing, the lattice change rate is further reduced, thereby inhibiting the dissolution of manganese, and reducing the consumption of the electrolyte solution and the active lithium; and for another thing, this is also beneficial to further reducing the surface oxygen activity and reducing the interface side reaction between the positive electrode active material and the electrolyte solution, thereby improving the cycling performance and high temperature storage performance of the battery.

In some embodiments, optionally, the Li/Mn antisite defect concentration of the positive electrode active material is 4% or less, optionally 2% or less.

In the positive electrode active material of the present application, the Li/Mn antisite defect refers to the interchange of the positions of $Li^+$ and $Mn^+$ in the $LiMnPO_4$ lattice. Since the $Li^+$ transport channel is a one-dimensional channel, and it is difficult for $Mn^+$ to migrate in the $Li^+$ transport channel, the $Mn^+$ with an antisite defect will hinder the transport of $Li^+$. The capacity of gram and rate performance of $LiMnPO_4$ can be improved by controlling the Li/Mn antisite defect concentration at a low level. In the present application, the antisite defect concentration can be measured according to JIS K 0131-1996, for example.

In some embodiments, optionally, the lattice change rate of the positive electrode active material is no more than 6%, optionally no more than 4%.

The lithium intercalation and deintercalation processes of $LiMnPO_4$ involve a two-phase reaction. The interfacial stress of the two phases is determined by the lattice change rate. The smaller the lattice change rate, the smaller the interfacial stress and the easier the transport of $Li^+$. Therefore, reducing the lattice change rate of the inner core will be beneficial to an enhanced $Li^+$ transport capacity, thereby improving the rate performance of the secondary battery.

In some embodiments, optionally, the positive electrode active material has an average button cell discharge voltage of 3.5V or more, and a discharge capacity of gram of 140 mAh/g or more; optionally, an average discharge voltage of 3.6V or more, and a discharge gram capacity of 145 mAh/g or more.

Although the average discharge voltage of the undoped $LiMnPO_4$ is 4.0 V or more, the discharge gram capacity thereof is low, usually less than 120 mAh/g, and thus the energy density is low. By adjusting the lattice change rate by doping, the discharge gram capacity can be greatly increased, and the overall energy density can be significantly increased when the average discharge voltage reduces slightly.

In some embodiments, optionally, the surface oxygen valence state of the positive electrode active material is no more than −1.88, optionally −1.98 to −1.88.

This is because the higher the valence state of oxygen in a compound, the stronger the ability to obtain electrons, that is, the stronger the oxidability. In the lithium manganese phosphate positive electrode active material of the present application, by controlling the surface valence state of oxygen at a lower level, the reactivity of the surface of the positive electrode material can be reduced and the interface side reaction between the positive electrode material and the electrolyte solution can be reduced, thus improving the cycling performance and high temperature storage performance of the secondary battery.

In some embodiments, optionally, the compacted density of the positive electrode active material under 3 ton (T) is no less than 2.0 $g/cm^3$, optionally no less than 2.2 $g/cm^3$.

A higher compacted density of the positive electrode active material, i.e., a greater weight of the active substance per unit volume, facilitates the increase of the volumetric energy density of the battery. In the present application, the compacted density can be measured according to GB/T 24533-2009, for example.

The positive electrode plate of the present application comprises a positive electrode current collector and a positive electrode film layer provided on at least one surface of the positive electrode current collector, the positive electrode film layer comprising a lithium manganese phosphate positive electrode active material of the present application or the lithium manganese phosphate positive electrode active material prepared by the method according to the present application, and the content of the positive electrode active material in the positive electrode film layer being no less than 10 wt %, based on the total weight of the positive electrode film layer.

In some embodiments, optionally, the content of the positive electrode active material in the positive electrode film layer is 90 to 99.5 wt %, based on the total weight of the positive electrode film layer.

As an example, the positive electrode current collector has two surfaces opposite in its own thickness direction, and the positive electrode film layer is provided on either or both of opposite surfaces of the positive electrode current collector.

In some embodiments, the positive electrode current collector can be a metal foil or a composite current collector. For example, as a metal foil, an aluminum foil can be used. The composite current collector may comprise a polymer material substrate and a metal layer formed on at least one surface of the polymer material substrate. The composite current collector can be formed by forming a metal material (aluminum, an aluminum alloy, nickel, a nickel alloy, titanium, a titanium alloy, silver and a silver alloy, etc.) on a polymer material substrate (such as polypropylene (PP), polyethylene terephthalate (PET), polybutylene terephthalate (PBT), polystyrene (PS), polyethylene (PE), etc.).

In some embodiments, the positive electrode film layer may optionally comprise a binder. As an example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylate resin.

In some embodiments, the positive electrode film layer also optionally comprises a conductive agent. As an example, the conductive agent may include at least one of superconducting carbon, acetylene black, carbon black, Ketjen black, carbon dots, carbon nanotubes, graphene, and carbon nanofibers.

In some embodiments, the positive electrode film layer of the present application includes 90-99.5% of a lithium manganese phosphate positive electrode active material of the present application, 0.4-5.5% of a binder, 0.1-2.5% of a conductive carbon and 0.001-1% of other additives, based on the total weight of the positive electrode film layer.

In some embodiments, optionally, the positive electrode film layer of the present application may also include other additives such as a dispersant, an infiltration agent, a rheology modifier and other additives commonly used in this field.

In some embodiments, the positive electrode plate can be prepared as follows: dispersing the above-mentioned components for preparing the positive electrode plate, such as a positive electrode active material, a conductive agent, a binder and any other components, in a solvent (e.g., N-methyl pyrrolidone) to form a positive electrode slurry; and coating the positive electrode current collector with the positive electrode slurry, followed by the procedures such as drying and cold pressing, so as to obtain the positive electrode plate.

In some embodiments, the positive electrode film layer of the present application has a coating weight of 0.28-0.45 g/1540.25 $mm^2$, and a compacted density reaching 2.2-2.8 $g/cm^3$.

It should to be noted that herein, the median particle size $D_{v50}$ refers to a particle size corresponding to a cumulative volume distribution percentage of the positive electrode active material reaching 50%. In the present application, the median particle size $D_{v50}$ of the positive electrode active material may be determined using a laser diffraction particle size analysis method. For example, the determination may be carried out with reference to the standard GB/T 19077-2016 using a laser particle size analyzer (e.g., Malvern Master Size 3000).

Herein, the term "coating layer" refers to a substance layer coated on the inner core. The substance layer can completely or partially cover the inner core. The use of "coating layer" is only for the convenience of description and is not intended to limit the present disclosure. Likewise, the term "thickness of the coating layer" refers to the thickness of the substance layer coated on the inner core in the radial direction of the inner core.

As used herein, the term "source" refers to a compound that is the source of a certain element. As an example, the types of the "source" include but are not limited to carbonates, sulfates, nitrates, elemental substances, halides, oxides, hydroxides etc.

Beneficial Effects

One or more embodiments of the present application have one or more of the following beneficial effects:

(1) in the present application, by modifying lithium manganese phosphate, a positive electrode active material is obtained, which can significantly reduce manganese dissolution and reduce the lattice change rate and then has good cycling performance, high-temperature storage performance and safety performance. The first coating layer of the positive electrode active material of the present application includes pyrophosphate and phosphate. Due to the high migration barrier (>1 eV) of transition metals in pyrophosphate, the dissolution of the transition metals can be effectively inhibited. The phosphate has an excellent lithium ion conductivity, and can reduce the content of lithium impurities on the surface. In addition, since the second coating layer is a carbon-containing layer, the electrical conductivity and desolvation ability of $LiMnPO_4$ can be effectively improved. In addition, the "barrier" effect of the second coating layer can further hinder the migration of manganese ions into the electrolyte and reduce the corrosion of the active material by the electrolyte. Therefore, the present application, by specific element doping and surface coating on lithium manganese phosphate, can effectively inhabit the dissolution of Mn in the process of lithium intercalation-deintercalation, and at the same time promote the migration of lithium ions, thereby improving the rate performance of the battery cell and increasing the cycling performance and high temperature performance of the secondary battery.

(2) When the BET specific surface area of the positive electrode active material is large and there are many small particles, it easily results in a weaker bonding strength between the positive electrode active material and the current collector (aluminum foil), and the film peeling during the coating process. In the present application, a new conductive undercoat layer is used to increase the bonding strength between the positive electrode active material layer and the current collector.

(3) During the process of coating the surface of the conductive undercoat layer with the positive electrode active material slurry (containing a solvent of N-methylpyrrolidone, referred to as NMP for short), the first polymer in the conductive undercoat layer will be dissolved again after coming into contact with the solvent of NMP, so as to interdiffuse with the positive electrode active material slurry, and after curing, the active material layer can be integrated with the undercoat layer, thereby effectively increasing the bonding strength between the positive electrode film layer and the positive electrode current collector.

(4) When an acrylic acid-acrylate copolymer (weight-average molecular weight: 200,000-1,500,000) is used as the first water-based binder in the conductive undercoat layer, the binder having a strong polarity can realize good bonding with the current collector (aluminum foil). In addition, the acrylic acid-acrylate copolymer has good stability in the electrolyte solution, high temperature resistance, corrosion resistance, and a low electrolyte solution-absorbing efficiency (low swelling degree).

(5) When the conductive agent in the conductive undercoat layer is selected from one or two of carbon black, acetylene black, carbon fibers, graphite, and carbon nanotubes, the interface resistance can be reduced, the charge/discharge rate performance of the battery can be improved, and the cycle life of the battery is prolonged.

LIST OF REFERENCE SIGNS

Figure 1:
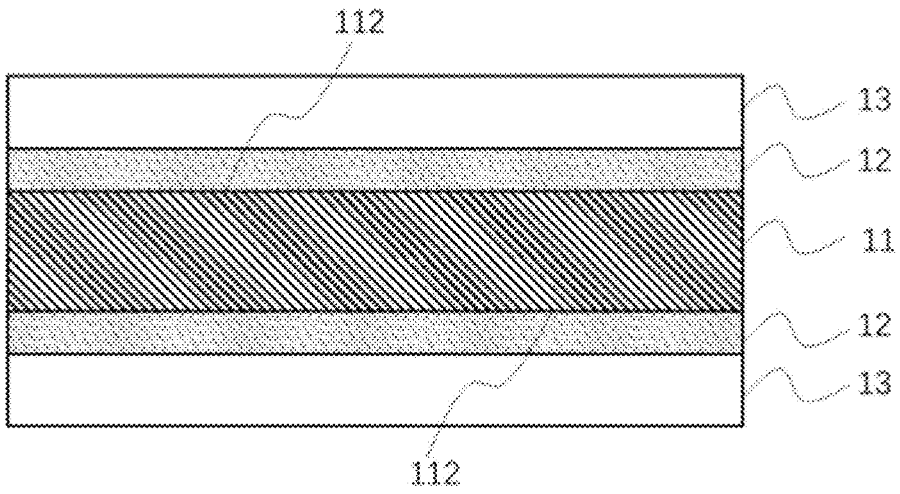
FIG. 1 is a schematic diagram of a positive electrode plate according to one embodiment of the present application.

1 battery pack; 2 upper box body; 3 lower box body; 4 battery module; 5 secondary battery; 51 housing; 52 electrode assembly; 53 top cover assembly; 11 positive electrode current collector; 112 surface; 12 conductive undercoat layer; 13 positive electrode film layer; 510 steel plate; 520 double-sided tape; 530 electrode plate;

DETAILED DESCRIPTION OF EMBODIMENTS

Hereinafter, embodiments of a positive electrode active material and a preparation method therefor, a positive electrode plate, a negative electrode plate, a secondary battery, a battery module, a battery pack, and a device of the present application are described in detail and specifically disclosed with reference to the accompanying drawings as appropriate. However, unnecessary detailed illustrations may be omitted in some instances. For example, there are situations where detailed description of well known items and repeated description of actually identical structures are omitted. This is to prevent the following description from being unnecessarily verbose, and facilitates understanding by those skilled in the art. Moreover, the accompanying drawings and the descriptions below are provided for enabling those skilled in the art to fully understand the present application, rather than limiting the subject matter disclosed in claims.

"Ranges" disclosed in the present application are defined in the form of lower and upper limits, and a given range is defined by selection of a lower limit and an upper limit, the selected lower and upper limits defining the boundaries of the particular range. Ranges defined in this manner may be inclusive or exclusive, and may be arbitrarily combined, that is, any lower limit may be combined with any upper limit to form a range. For example, if the ranges of 60-120 and 80-110 are listed for a particular parameter, it should be understood that the ranges of 60-110 and 80-120 are also contemplated. Additionally, if minimum range values 1 and 2 are listed, and maximum range values 3, 4, and 5 are listed, the following ranges are all contemplated: 1-3, 1-4, 1-5, 2-3, 2-4, and 2-5. In the present application, unless stated otherwise, the numerical range "a-b" denotes an abbreviated representation of any combination of real numbers between a and b, where both a and b are real numbers. For example, the numerical range "0-5" means that all real numbers between "0-5" have been listed herein, and "0-5" is just an abbreviated representation of combinations of these numerical values. In addition, when a parameter is expressed as an integer of ≥2, it is equivalent to disclosing that the parameter is, for example, an integer of 2, 3, 4, 5, 6, 7, 8, 9, 10, 11, 12, and the like.

All the implementations and optional implementations of the present application can be combined with one another to form new technical solutions, unless otherwise stated.

All technical features and optional technical features of the present application can be combined with one another to form a new technical solution, unless otherwise stated.

Unless otherwise stated, all the steps of the present application can be carried out sequentially or randomly, preferably sequentially. For example, the method including steps (a) and (b) indicates that the method may include steps (a) and (b) performed sequentially, and may also include steps (b) and (a) performed sequentially. For example, reference to "the method may further include step (c)" indicates that step (c) may be added to the method in any order, e.g., the method may include steps (a), (b) and (c), or steps (a), (c) and (b), or steps (c), (a) and (b), etc.

The terms "comprise" and "include" mentioned in the present application are open-ended or closed-ended, unless otherwise stated. For example, "comprise" and "include" may mean that other components not listed may further be comprised or included, or only the listed components may be comprised or included.

In the present application, the term "or" is inclusive unless otherwise specified. For example, the phrase "A or B" means "A, B, or both A and B". More specifically, a condition "A or B" is satisfied by any one of the following: A is true (or present) and B is false (or not present); A is false (or not present) and B is true (or present); or both A and B are true (or present).

Secondary Battery

A secondary battery, also known as a rechargeable battery or an accumulator, refers to a battery of which active materials can be activated by means of charging for reuse of the battery after the battery is discharged.

Generally, the secondary battery comprises a positive electrode plate, a negative electrode plate, a separator and an electrolyte. During a charge/discharge process of the battery, active ions (e.g., lithium ions) are intercalated and de-intercalated back and forth between the positive electrode plate and the negative electrode plate. The separator is provided between the positive electrode plate and the negative electrode plate, and mainly prevents positive and negative electrodes from short-circuiting and enables the active ions to pass through. The electrolyte is provided between the positive electrode plate and the negative electrode plate and mainly functions for active ion conduction.

[Positive Electrode Plate]

In a first aspect, the present application provides a positive electrode plate, comprising a positive electrode current collector, a positive electrode film layer provided on at least one surface of the positive electrode current collector, and a conductive undercoat layer between the positive electrode current collector and the positive electrode film layer, wherein

- the positive electrode film layer comprises a positive electrode active material with a core-shell structure; the positive electrode active material comprises an inner core and a shell coating the inner core;
- the inner core includes $Li_{1+x}Mn_{1-y}A_yP_{1-z}R_zO_4$, where x=−0.100 to 0.100, y=0.001 to 0.500, z=0.001 to 0.100; A is selected from one or more of Zn, Al, Na, K, Mg, Mo, W, Ti, V, Zr, Fe, Ni, Co, Ga, Sn, Sb, Nb and Ge, optionally one or more of Fe, Ti, V, Ni, Co and Mg; and R is selected from one or more of B, Si, N and S;
- the shell includes a first coating layer coating the inner core and a second coating layer coating the first coating layer, wherein
- the first coating layer includes pyrophosphate of $MP_2O_7$ and phosphate of $XPO_4$, wherein M and X are each independently selected from one or more of Li, Fe, Ni, Mg, Co, Cu, Zn, Ti, Ag, Zr, Nb or Al; and
- the second coating layer includes carbon; and
- the conductive undercoat layer includes a first polymer, a first water-based binder, and a first conductive agent, the first polymer comprises a first monomer unit represented by formula 1;

a second monomer unit selected from at least one of a group consisting of a monomer unit represented by formula 2 and a monomer unit represented by formula 3;

a third monomer unit selected from at least one of a group consisting of a monomer unit represented by formula 4 and a monomer unit represented by formula 5; and a fourth monomer unit represented by formula 6, in which $R^1$, $R^2$, and $R^3$ each independently represent H, a carboxyl, an ester group, and groups of substituted or unsubstituted C1-C10 alkyl, C1-C10 alkoxy, C2-C10 alkenyl, and C6-C10 aryl, and $R^4$ C10 alkenyl, and C6-C10 aryl;

formula 1

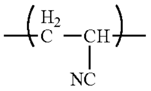

formula 2

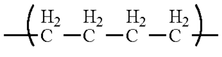

formula 3

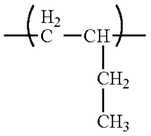

formula 4

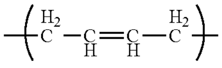

formula 5

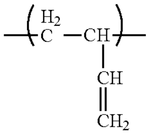

formula 6

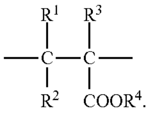

In the positive electrode plate based on the above solution, the positive electrode film layer and the positive electrode current collector have enhanced bonding strength. Without being limited by theory, during the process of coating the surface of the conductive undercoat layer with the positive electrode active material slurry (containing a solvent of N-methylpyrrolidone, referred to as NMP for short), the first polymer in the conductive undercoat layer will be dissolved again after coming into contact with the solvent of NMP, so as to interdiffuse with the positive electrode active material slurry, and after curing, the active material layer can be integrated with the undercoat layer, thereby effectively increasing the bonding strength between the positive electrode film layer and the positive electrode current collector.

In some embodiments, the first polymer is a random copolymer.

Nitrile rubber (NBR) is a random copolymer formed by polymerization (such as emulsion polymerization) of acrylonitrile and butadiene monomers, and has a general structure of:

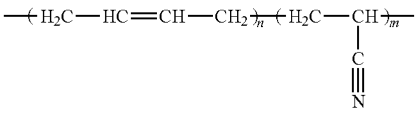

In the nitrile rubber, butadiene (B) and acrylonitrile (A) segments are generally linked in a manner of BAB, BBA or ABB, ABA and BBB tridas, but with the increase of acrylonitrile content, there are also AABAA linked in pentad, and even as a bulk acrylonitrile polymer. In the nitrile rubber, the sequence distribution of butadiene is mainly in a trans-1,4 structure, and the microstructure thereof depends on the polymerization conditions.

A hydrogenated nitrile rubber (HNBR) refers to the product obtained by hydrogenating the carbon-carbon double bonds on the molecular chain of a nitrile rubber to partial or full saturation. The chemical formula of a fully saturated hydrogenated nitrile rubber is as follows:

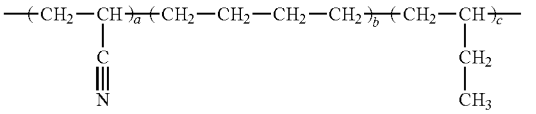

There are three main methods for the preparation of a hydrogenated nitrile rubber (HNBR): an ethylene-acrylonitrile copolymerization method, an NBR solution hydrogenation method and an NBR emulsion hydrogenation method.

A hydrogenated carboxybutyl rubber (HXNBR) is a polymer formed by copolymerization of nitrile (such as acrylonitrile), a conjugated diene (such as butadiene) and an ester of a unsaturated carboxylic acid, followed by selective hydrogenation of C═C. The so-called hydrogenated carboxybutyl rubber involves the further introduction of carboxyl groups on the basis of a hydrogenated nitrile rubber.

The ester of an unsaturated carboxylic acids includes, for example, an ester of an α,β-unsaturated monocarboxylic acid. The esters of α,β-unsaturated monocarboxylic acids which can be used are the alkyl esters and alkoxyalkyl esters thereof; optionally, alkyl esters of α,β-unsaturated monocarboxylic acids, such as C1-C18 alkyl esters, optionally alkyl esters of acrylic acid or methacrylic acid, such as C1-C18 alkyl esters, for example, methyl acrylate, ethyl acrylate, propyl acrylate, n-butyl acrylate, tert-butyl acrylate, 2-ethylhexyl acrylate, n-dodecyl acrylate, methyl methacrylate, ethyl methacrylate, butyl methacrylate and 2-ethylhexyl methacrylate; also optionally alkoxyalkyl esters of α,β-unsaturated monocarboxylic acids, optionally alkoxyalkyl esters of acrylic or methacrylic acid, for example C2-C12-alkoxyalkyl of acrylic or methacrylic acid, very optionally methoxymethyl acrylate, methoxyethyl (meth) acrylate, ethoxyethyl (meth)acrylate and methoxyethyl (meth)acrylate. Mixtures of alkyl esters such as those described above with alkoxyalkyl esters such as those described above may also be used. Hydroxyalkyl acrylate and hydroxyalkyl methacrylate in which the number of carbon atoms in the hydroxyalkyl group is 1-12 can also be used, for example 2-hydroxyethyl acrylate, 2-hydroxyethyl methacrylate and 3-hydroxypropyl acrylate. Likewise, epoxy-containing esters such as glycidyl methacrylate may be used. Cyanoalkyl acrylates and cyanoalkyl methacrylates with 2-12 C atoms in the cyanoalkyl can also be used, for example α-cyanoethyl acrylate, β-cyanoethyl acrylate and cyanobutyl methacrylate. Acrylates or methacrylates containing fluorine-substituted benzyl groups can also be used, for example, fluorobenzyl acrylate and fluorobenzyl methacrylate. Acrylates and methacrylates containing fluoroalkyl groups can also be used, for example trifluoroethyl acrylate and tetrafluoropropyl methacrylate. Amino group-containing α,β-unsaturated carboxylic acid esters such as dimethylaminomethyl acrylate and diethylaminoethyl acrylate can also be used.

In some embodiments, based on the total mass of the first polymer,

- the mass percentage content of the first monomer unit is M1, and M1 is 10%-55%, optionally 25%-55%; and/or
- the mass percentage content of the second monomer unit is M2, and M2 is 40%-80%, optionally 50%-70%; and/or
- the mass percentage content of the third monomer unit is M3, and M3 is 0%-10%, optionally 0.001%-2%; and/or
- the mass percentage content of the fourth monomer unit is M4, and M4 is 0%-10%, optionally 0.1%-1%.

The conductive undercoat layer based on this solution can be moderately dissolved during the coating process, thereby forming an enhanced bond with the positive electrode film layer.

In some embodiments, based on the total mass of the first polymer,

- the mass percentage content of the first monomer unit is M1, and M1 is 10%-55%, optionally 10%-15%, 15%-20%, 20%-25%, 25%-30%, 30%-35%, 35%-40%, 40%-45%, 45%-50% or 50%-55%; and/or
- the mass percentage content of the second monomer unit is M2, and M2 is 40%-80%, optionally 40%-45%, 45%-50%, 50%-55%, 55%-60%, 60%-65%, 65%-70%, 70%-75% or 75%-80%; and/or
- the mass percentage content of the third monomer unit is M3, M3 is 0%-10%, optionally 0.001%-1%, 1%-2%, 2%-3%, 3%-4%, 4%-5%, 5%-6%, 6%-7%, 7%-8%, 8%-9% or 9%-10%; and/or
- the mass percentage content of the fourth monomer unit is M4, and M4 is 0%-10%, optionally 0.01%-1%, 1%-2%, 2%-3%, 3%-4%, 4%-5%, 5%-6%, 6%-7%, 7%-8%, 8%-9% or 9%-10%. The positive electrode plate based on this solution is used in secondary batteries, where one or more of the properties of the secondary battery are significantly improved. The conductive undercoat layer based on this solution can be moderately dissolved during the coating process, thereby forming an enhanced bond with the positive electrode film layer.

In some embodiments, M3/(M2+M3) is 0%-5%, optionally 0.001%-1%. The positive electrode plate based on this solution is used in secondary batteries, where one or more of the properties of the secondary battery are significantly improved.

In some embodiments, M3/(M2+M3) is 0.01%-1%, 1%-2%, 2%-3%, 3%-4% or 4%-5%.

In some embodiments, the first polymer includes one or more selected from hydrogenated nitrile rubbers, and hydrogenated carboxylated nitrile rubbers; and/or, the weight-average molecular weight of the first polymer is 50,000-1,500,000, optionally 200,000-400,000. The positive electrode plate based on this solution is used in secondary batteries, where one or more of the properties of the secondary battery are significantly improved.

In some embodiments, the first polymer has a weight-average molecular weight of 100,000-300,000, 300,000-500,000, 500,000-700,000, 700,000-900,000, 900,000-1,100,000, 1,100,000-1,300,000 or 1,300,000-1,500,000.

In some embodiments, the first water-based binder includes one or more selected from a water-based polyacrylic resin and a derivative thereof, a water-based amino-modified polypropylene resin and a derivative thereof, and a polyvinyl alcohol and a derivative thereof, optionally a water-based acrylic acid-acrylate copolymers; and/or the first water-based binder has a weight-average molecular weight of 200,000-1,500,000, optionally 300,000-400,000. The positive electrode plate based on this solution is used in secondary batteries, where one or more of the properties of the secondary battery are significantly improved.

In some embodiments, the first water-based binder has a weight-average molecular weight of 100,000-300,000, 300,000-500,000, 500,000-700,000, 700,000-900,000, 900,000-1,100,000, or 1,100,000-1,300,000.

In some embodiments, the first conductive agent includes one or more selected from superconductive carbon, conductive graphite, acetylene black, carbon black, Ketjen black, carbon dots, carbon nanotubes, graphene, and carbon nanofibers, optionally one or more selected from carbon nanotubes, graphene, and carbon nanofibers. The positive electrode plate based on this solution is used in secondary batteries, where one or more of the properties of the secondary battery are significantly improved.

In some embodiments, based on the total mass of the conductive undercoat layer,

- the mass percentage content of the first polymer is X1, and X1 is 5%-20%, optionally 5%-10%; and/or
- the mass percentage content of the first water-based binder is X2, and X2 is 30%-80%, optionally 40%-50%; and/or
- the mass percentage content of the first conductive agent is X3, and X3 is 10%-50%, optionally 40%-50%. The positive electrode plate based on this solution is used in secondary batteries, where one or more of the properties of the secondary battery are significantly improved.

In some embodiments, the conductive undercoat layer has a thickness of 1 μm-20 μm, optionally 3 μm-10 μm. The positive electrode plate based on this solution is used in secondary batteries, where one or more of the properties of the secondary battery are significantly improved.

In some embodiments, the positive electrode film layer further includes one or more selected from an infiltration agent and a dispersant, optionally, the positive electrode film layer further includes both an infiltration agent and a dispersant. The positive electrode plate based on this solution is used in secondary batteries, where one or more of the properties of the secondary battery are significantly improved.

In some embodiments, the infiltration agent has a surface tension of 20 mN/m-40 mN/m, optionally, the infiltration agent includes at least one of the functional groups of: —CN, $—NH_2$, —NH—, —N—, —OH, —COO—, and —C(═O)—O—C(═O)—. The positive electrode plate based on this solution is used in secondary batteries, where one or more of the properties of the secondary battery are significantly improved.

In some embodiments, the surface tension can be measured using the Wilhelmy Plate Method. For the specific test steps, reference can be made to general standards in the field, such as GBT/22237-2008 Surface Active Agents-Determination of Surface Tension, such as ASTM D1331-14. Standard Test Methods for Surface and Interfacial Tension of Solutions of Paints, Solvents, and Solutions of Surface-Active Agents and Related Materials.

In some embodiments, the infiltration agent includes one or more selected from a small molecule organic solvent and a low molecular weight polymer.

Optionally, the small molecule organic solvent includes one or more selected from an alcohol amine compound, an alcohol compound, and a nitrile compound, and optionally, the alcohol amine compound has a number of carbon atom of 1-16, optionally 2-6.

Optionally, the low molecular weight polymer includes one or more selected from a maleic anhydride-styrene copolymer, polyvinylpyrrolidone, and polysiloxane, and optionally, the low molecular weight polymer has a weight-average molecular weight of no more than 6000, optionally 3000-6000. The positive electrode plate based on this solution is used in secondary batteries, where one or more of the properties of the secondary battery are significantly improved.

In some embodiments, the dispersant includes a second polymer, and the second polymer comprises:

a fifth monomer unit represented by formula 7;

a sixth monomer unit selected from at least one of a group consisting of a monomer unit represented by formula 8 and a monomer unit represented by formula 9; and a seventh monomer unit selected from at least one of a group consisting of a monomer unit represented by formula 10 and a monomer unit represented by formula 11;

formula 7

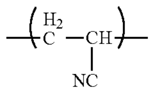

formula 8

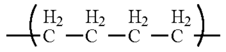

formula 9

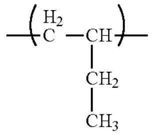

formula 10

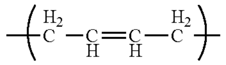

formula 11

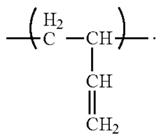

The positive electrode plate based on this solution is used in secondary batteries, where one or more of the properties of the secondary battery are significantly improved.

In some embodiments, based on the total mass of the second polymer, the mass percentage content of the fifth monomer unit is M5, and M5 is 10%-55%, optionally 25%-55%; and/or the mass percentage content of the sixth monomer unit is M6, and M6 is 40%-80%, optionally 50%-70%; and/or the mass percentage content of the seventh monomer unit is M7, and M7 is 0%-10%, optionally 0.001%-2%.

In some embodiments, based on the total mass of the second polymer, the mass percentage content of the fifth monomer unit is M5, and M5 is 10%-55%, optionally 10%-15%, 15%-20%, 20%-25%, 25%-30%, 30%-35%, 35%-40%, 40%-45%, 45%-50% or 50%-55%; and/or the mass percentage content of the sixth monomer unit is M6, and M6 is 40%-80%, optionally 40%-45%, 45%-50%, 50%-55%, 55%-60%, 60%-65%, 65%-70%, 70%-75% or 75%-80%; and/or the mass percentage content of the seventh monomer unit is M7, and M7 is 0%-10%, optionally 0.01%-1%, 1%-2%, 2%-3%, 3%-4%, 4%-5%, 5%-6%, 6%-7%, 7%-8%, 8%-9% or 9%-10%.

In some embodiments, M7/(M6+M7) is 0%-5%, optionally 0.001%-1%. The positive electrode plate based on this solution is used in secondary batteries, where one or more of the properties of the secondary battery are significantly improved.

In some embodiments, the second polymer is a hydrogenated nitrile rubber; and/or the second polymer has a weight-average molecular weight of 50,000-500,000, optionally 150,000-350,000. The positive electrode plate based on this solution is used in secondary batteries, where one or more of the properties of the secondary battery are significantly improved.

In some embodiments, based on the total mass of the positive electrode film layer, the mass percentage content of the dispersant is Y1, and Y1 is 0.05%-1%, optionally 0.1%-0.5%, and/or the mass percentage content of the infiltration agent is Y2, and Y2 is 0.05%-2%, optionally 0.2%-0.8%. The positive electrode plate based on this solution is used in secondary batteries, where one or more of the properties of the secondary battery are significantly improved.

In some embodiments, Y1/Y2 is 0.05-20, optionally 0.1-1, further 0.3-0.8. The positive electrode plate based on this solution is used in secondary batteries, where one or more of the properties of the secondary battery are significantly improved.

In some embodiments, in the positive electrode plate, the mass ratio of the first polymer to the second polymer is 1.5-5, optionally 2-3. The positive electrode plate based on this solution is used in secondary batteries, where one or more of the properties of the secondary battery are significantly improved.

In some embodiments, the first coating layer has an interplanar spacing of the phosphate of 0.345-0.358 nm, and an angle of the crystal direction (111) of 24.25°-26.45°; and the first coating layer has an interplanar spacing of the pyrophosphate of 0.293-0.326 nm, and an angle of the crystal direction (111) of 26.41°-32.57°. The positive electrode plate based on this solution is used in secondary batteries, where one or more of the properties of the secondary battery are significantly improved.

In some embodiments, in the inner core, the ratio of y to 1-y is 1:10 to 10:1, optionally 1:4 to 1:1; and/or, in the inner core, the ratio of z to 1-z is 1:9 to 1:999, optionally 1:499 to 1:249. The positive electrode plate based on this solution is used in secondary batteries, where one or more of the properties of the secondary battery are significantly improved.

In some embodiments, the coating amount of the first coating layer is greater than 0 wt % and less than or equal to 7 wt %, optionally 4-5.6 wt %, based on the weight of the inner core. The positive electrode plate based on this solution is used in secondary batteries, where one or more of the properties of the secondary battery are significantly improved.

In some embodiments, the weight ratio of the pyrophosphate to phosphate in the first coating layer is 1:3 to 3:1, optionally 1:3 to 1:1. The positive electrode plate based on this solution is used in secondary batteries, where one or more of the properties of the secondary battery are significantly improved.

In some embodiments, the pyrophosphate and the phosphate each independently have a crystallinity of 10% to 100%, optionally 50% to 100%. The positive electrode plate based on this solution is used in secondary batteries, where one or more of the properties of the secondary battery are significantly improved.

In some embodiments, the coating amount of the second coating layer is greater than 0 wt % and less than or equal to 6 wt %, optionally 3-5 wt %, based on the weight of the inner core. The positive electrode plate based on this solution is used in secondary batteries, where one or more of the properties of the secondary battery are significantly improved.

In some embodiments, A is selected from at least two of Fe, Ti, V, Ni, Co and Mg. The positive electrode plate based on this solution is used in secondary batteries, where one or more of the properties of the secondary battery are significantly improved.

In some embodiments, the Li/Mn antisite defect concentration of the positive electrode active material is 4% or less, optionally 2% or less. The positive electrode plate based on this solution is used in secondary batteries, where one or more of the properties of the secondary battery are significantly improved.

In any embodiment, a lattice change rate of the positive electrode active material is no more than 6%, optionally no more than 4%. The positive electrode plate based on this solution is used in secondary batteries, where one or more of the properties of the secondary battery are significantly improved.

In some embodiments, the surface oxygen valence state of the positive electrode active material is no more than −1.88, optionally −1.98 to −1.88. The positive electrode plate based on this solution is used in secondary batteries, where one or more of the properties of the secondary battery are significantly improved.

In some embodiments, the compacted density of the positive electrode active material under 3 tons is no less than 2.0 g/cm$^3$, optionally no less than 2.2 g/cm$^3$. The positive electrode plate based on this solution is used in secondary batteries, where one or more of the properties of the secondary battery are significantly improved.

In some embodiments, the present application provides a secondary battery, comprising the positive electrode plate according to any one of the above aspects.

In some embodiments, the present application provides a power consuming device comprising the above secondary battery.

In some embodiments, the positive electrode plate generally includes a positive electrode current collector and a positive film layer provided on at least one surface of the positive electrode current collector, the positive film layer including a positive electrode active material.

FIG. 1 shows a schematic diagram of a positive electrode plate of an embodiment. As shown in the figure, a positive electrode plate comprises a positive electrode current collector 11, a positive electrode film layer 13 provided on at least one surface 112 of the positive electrode current collector 11, and a conductive undercoat layer 12 between the positive electrode current collector 11 and the positive electrode film layer 13.

As an example, the positive electrode current collector has two surfaces opposite in its own thickness direction, and the positive electrode film layer is provided on either or both of opposite surfaces of the positive electrode current collector.

In some embodiments, the positive current collector can be a metal foil or a composite current collector. For example, as a metal foil, an aluminum foil can be used. The composite current collector may comprise a polymer material substrate and a metal layer formed on at least one surface of the polymer material substrate. The composite current collector can be formed by forming a metal material (aluminum, an aluminum alloy, nickel, a nickel alloy, titanium, a titanium alloy, silver and a silver alloy, etc.) on a polymer material substrate (such as polypropylene (PP), polyethylene terephthalate (PET), polybutylene terephthalate (PBT), polystyrene (PS), polyethylene (PE), etc.).

In some embodiments, the positive electrode film layer may optionally comprise a binder. As an example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylate resin.

In some embodiments, the positive electrode film layer also optionally comprises a conductive agent. As an example, the conductive agent may include at least one of superconducting carbon, acetylene black, carbon black, Ketj en black, carbon dots, carbon nanotubes, graphene, and carbon nanofibers.

In some embodiments, the positive electrode plate can be prepared as follows: dispersing the above-mentioned components for preparing the positive electrode plate, such as a positive electrode active material, a conductive agent, a binder and any other components, in a solvent (e.g., N-methyl pyrrolidone) to form a positive electrode slurry; and coating the positive electrode current collector with the positive electrode slurry, followed by the procedures such as drying and cold pressing, so as to obtain the positive electrode plate.

Negative Electrode Plate

The negative electrode plate comprises a negative electrode current collector and a negative electrode film layer provided on at least one surface of the negative electrode current collector, the negative electrode film layer comprising a negative electrode active material.

As an example, the negative electrode current collector has two surfaces opposite in its own thickness direction, and the negative electrode film layer is provided on either or both of the two opposite surfaces of the negative electrode current collector.

In some embodiments, the negative current collector may be a metal foil or a composite current collector. For example, as a metal foil, a copper foil can be used. The composite current collector may comprise a polymer material substrate and a metal layer formed on at least one surface of the polymer material substrate. The composite current collector can be formed by forming a metal material (copper, a copper alloy, nickel, a nickel alloy, titanium, a titanium alloy, silver and a silver alloy, etc.) on a polymer material substrate (e.g., polypropylene (PP), polyethylene terephthalate (PET), polybutylene terephthalate (PBT), polystyrene (PS), polyethylene (PE), etc.).

In some embodiments, the negative electrode active material can be a negative electrode active material known in the art for batteries. As an example, the negative electrode active material may include at least one of the following materials: artificial graphite, natural graphite, soft carbon, hard carbon, a silicon-based material, a tin-based material and lithium titanate, etc. The silicon-based material may be selected from at least one of elemental silicon, silicon oxides, silicon carbon composites, silicon nitrogen composites and silicon alloys. The tin-based material may be selected from at least one of elemental tin, tin oxides, and tin alloys. However, the present application is not limited to these materials, and other conventional materials that can be used as negative electrode active materials for batteries can also be used. These negative electrode active materials may be used alone or in combination of two or more.

In some embodiments, the negative electrode film layer may optionally comprise a binder. As an example, the binder may be selected from at least one of a styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS).

In some embodiments, the negative electrode film layer may optionally comprise a conductive agent. As an example, the conductive agent may be selected from at least one of superconductive carbon, acetylene black, carbon black, ketj enblack, carbon dots, carbon nanotubes, graphene, and carbon nanofibers.

In some embodiments, the negative electrode film layer may optionally comprise other auxiliary agents, such as thickener (e.g. sodium carboxymethyl cellulose (CMC-Na)) and the like.

In some embodiments, the negative electrode plate can be prepared as follows: dispersing the above-mentioned components for preparing the negative electrode plate, such as negative electrode active material, conductive agent, binder and any other components, in a solvent (e.g. deionized water) to form a negative electrode slurry; and coating a negative electrode current collector with the negative electrode slurry, followed by procedures such as drying and cold pressing, so as to obtain the negative electrode plate.

[Electrolyte]

The electrolyte functions to conduct ions between the positive electrode plate and the negative electrode plate. The type of the electrolyte is not specifically limited in the present application, and can be selected according to actual requirements. For example, the electrolyte may be in a liquid state, a gel state or an all-solid state.

In some embodiments, the electrolyte is liquid and includes an electrolyte salt and a solvent.

In some embodiments, the electrolyte salt may be selected from at least one of lithium hexafluorophosphate, lithium tetrafluoroborate, lithium perchlorate, lithium hexafluoroarsenate, lithium bisfluorosulfonimide, lithium bistrifluoromethanesulfonimide, lithium trifluoromethanesulfonate, lithium difluorophosphate, lithium difluorooxalate borate, lithium dioxalate borate, lithium difluorodioxalate phosphate and lithium tetrafluorooxalate phosphate.

In some embodiments, the solvent may be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, ethyl methyl sulfone, and diethyl sulfone.

In some embodiments, the electrolyte solution further optionally comprises an additive. As an example, the additive may include a negative electrode film-forming additive and a positive electrode film-forming additive, and may further include an additive that can improve some performance of the battery, such as an additive that improves overcharge performance of the battery, or an additive that improves high-temperature performance or low-temperature performance of the battery.

Separator

In some embodiments, the secondary battery further comprises a separator. The type of the separator is not particularly limited in the present application, and any well known porous-structure separator with good chemical stability and mechanical stability may be selected.

In some embodiments, the material of the separator may be selected from at least one of glass fibers, non-woven fabrics, polyethylene, polypropylene and polyvinylidene fluoride. The separator may be either a single-layer film or a multi-layer composite film, and is not limited particularly. When the separator is a multi-layer composite film, the materials in the respective layers may be same or different, which is not limited particularly.

In some embodiments, an electrode assembly may be formed by a positive electrode plate, a negative electrode plate and a separator by a winding process or a stacking process.

In some embodiments, the secondary battery may comprise an outer package. The outer package can be used to encapsulate the above-mentioned electrode assembly and electrolyte.

In some embodiments, the outer package of the secondary battery can be a hard shell, for example, a hard plastic shell, an aluminum shell, a steel shell, etc. The outer package of the secondary battery may also be a soft bag, such as a pouch-type soft bag. The material of the soft bag may be plastics, and the examples of plastics may include polypropylene, polybutylene terephthalate, polybutylene succinate, etc.

Figure 3:
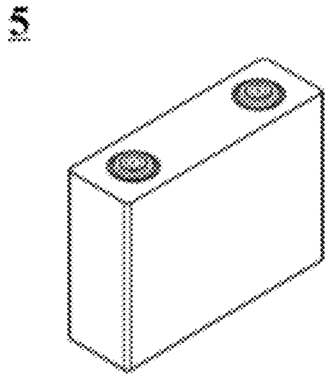
FIG. 3 is a schematic diagram of a secondary battery according to an embodiment of the present application.

The shape of the secondary battery is not particularly limited in the present application, and may be cylindrical, square or of any other shape. For example, FIG. 3 shows a secondary battery 5 with a square structure as an example.

Figure 4:
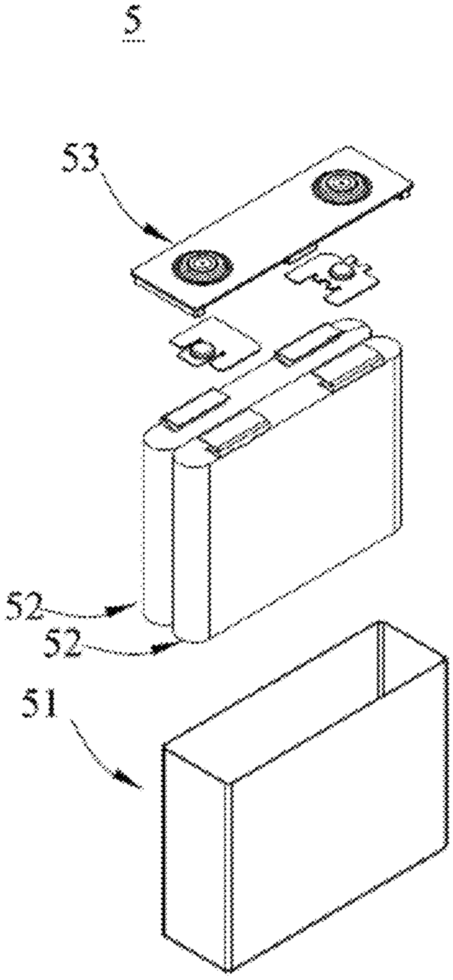
FIG. 4 is an exploded view of the secondary battery according to an embodiment of the present application as shown in FIG. 3.

In some embodiments, with reference to FIG. 4, the outer package may include a housing 51 and a cover plate 53. Herein, the housing 51 may comprise a bottom plate and side plates connected to the bottom plate, and the bottom plate and the side plates enclose to form an accommodating cavity. The housing 51 has an opening in communication with the accommodating cavity, and the cover plate 53 can cover the opening to close the accommodating cavity. The positive electrode plate, the negative electrode plate and the separator can be subjected to a winding process or a stacking process to form an electrode assembly 52. The electrode assembly 52 is encapsulated in the accommodating cavity. The electrolyte infiltrates the electrode assembly 52. The number of the electrode assemblies 52 contained in the secondary battery 5 may be one or more, and can be selected by those skilled in the art according to actual requirements.

In some embodiments, the secondary battery can be assembled into a battery module, and the number of the secondary batteries contained in the battery module may be one or more, and the specific number can be selected by those skilled in the art according to the application and capacity of the battery module.

Figure 5:
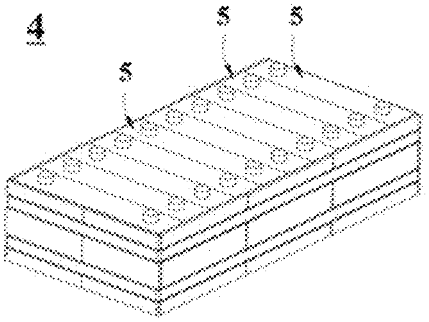
FIG. 5 is a schematic diagram of a battery module according to an embodiment of the present application.

FIG. 5 shows an exemplary battery module 4. Referring to FIG. 5, in the battery module 4, a plurality of secondary batteries 5 may be sequentially arranged in the length direction of the battery module 4. Apparently, the secondary batteries may also be arranged in any other manner. Furthermore, the plurality of secondary batteries 5 may be fixed by fasteners.

Optionally, the battery module 4 may also comprise a housing with an accommodating space, and a plurality of secondary batteries 5 are accommodated in the accommodating space.

In some embodiments, the above battery module may also be assembled into a battery pack, the number of the battery modules contained in the battery pack may be one or more, and the specific number can be selected by those skilled in the art according to the application and capacity of the battery pack.

Figure 6:
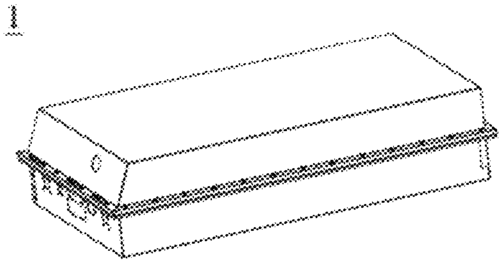
FIG. 6 is a schematic diagram of a battery pack according to an embodiment of the present application.
Figure 7:
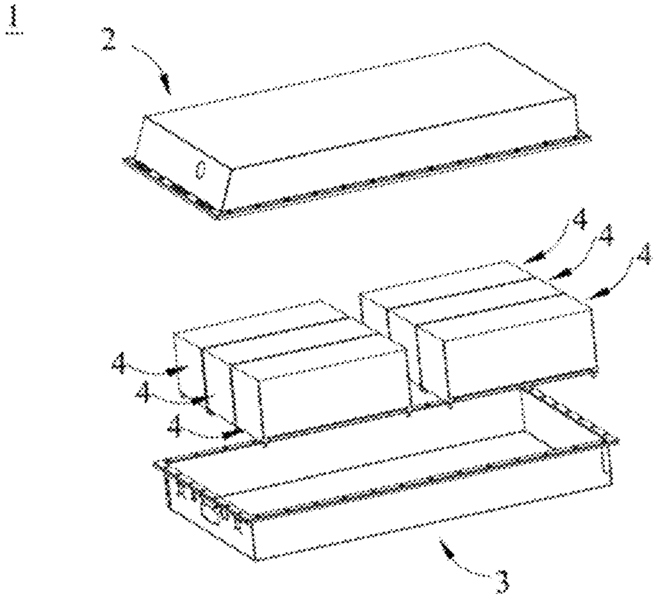
FIG. 7 is an exploded view of the battery pack according to an embodiment of the present application as shown in FIG. 6.

FIG. 6 and FIG. 7 show an exemplary battery pack 1. Referring to FIG. 6 and FIG. 7, the battery pack 1 may comprise a battery case and a plurality of battery modules 4 provided in the battery case. The battery box comprises an upper box body 2 and a lower box body 3, wherein the upper box body 2 can cover the lower box body 3 to form a closed space for accommodating the battery modules 4. A plurality of battery modules 4 may be arranged in the battery case in any manner.

In addition, the present application further provides a power consuming device. The power consuming device comprises at least one of the secondary battery, battery module, or battery pack provided by the present application. The secondary battery, battery module or battery pack can be used as a power source of the power consuming device or as an energy storage unit of the power consuming device. The power consuming device may include a mobile device (e.g., a mobile phone, a laptop computer, etc.), an electric vehicle (e.g., a pure electric vehicle, a hybrid electric vehicle, a plug-in hybrid electric vehicle, an electric bicycle, an electric scooter, an electric golf cart, an electric truck, etc.), an electric train, ship, and satellite, an energy storage system, etc., but is not limited thereto.

As for the power consuming device, the secondary battery, battery module or battery pack can be selected according to the usage requirements thereof.

Figure 8:
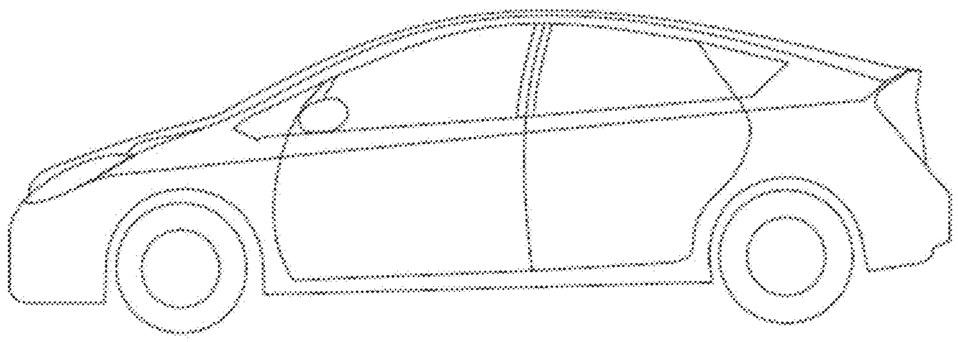
FIG. 8 is a schematic diagram of a power consuming device using a secondary battery according to an embodiment of the present application as a power source.
Figure 9:
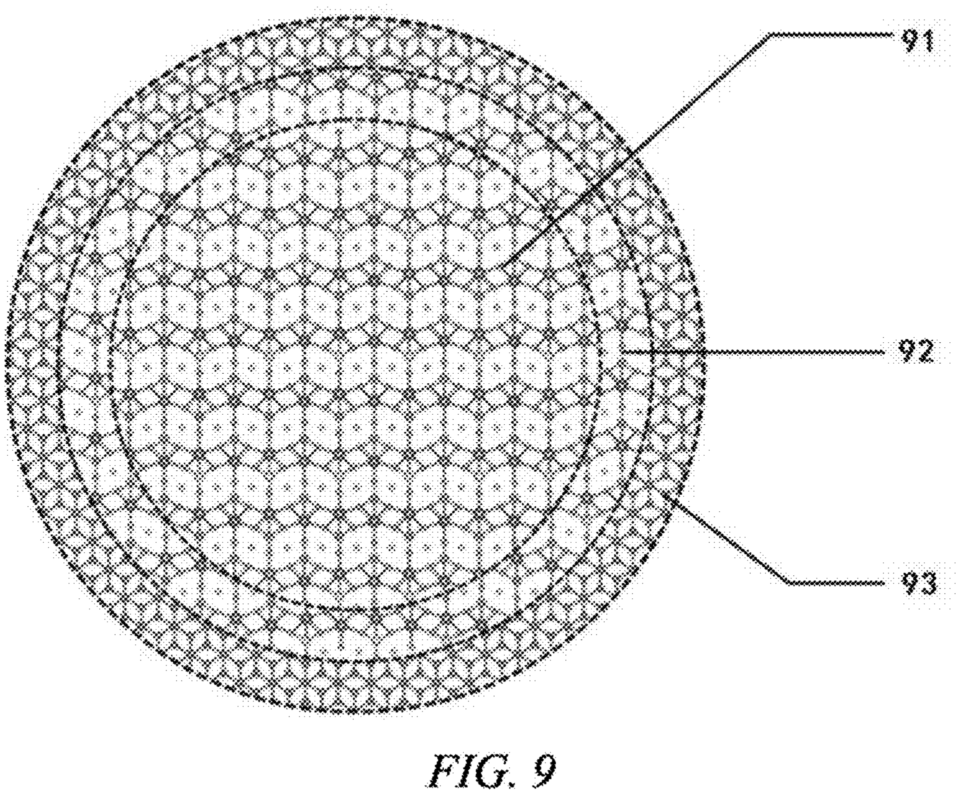
FIG. 9 is a schematic diagram of a positive electrode active material with a core-shell structure in an embodiment of the present application.
Figure 10:
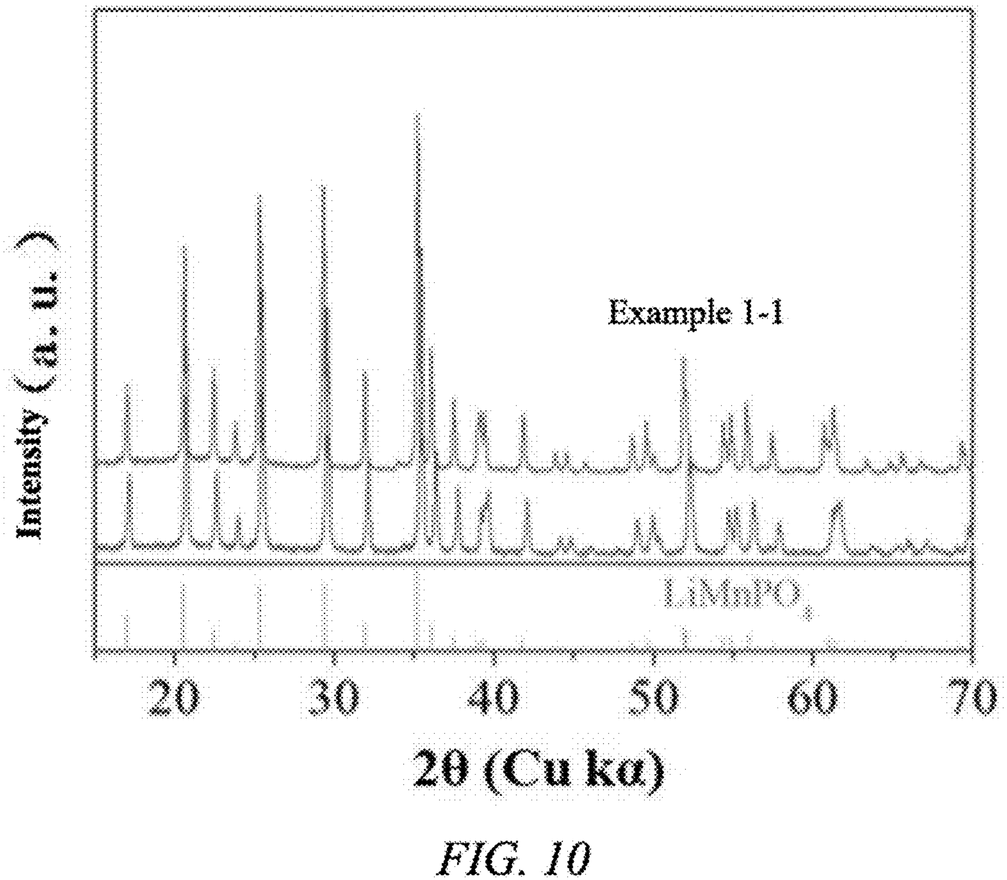
FIG. 10 shows the comparison of the XRD spectrum of example 1-1 of the present application before coating the first coating layer and the second coating layer with the standard XRD spectrum of lithium manganese phosphate (00-033-0804).

FIG. 8 shows an exemplary power consuming device. The power consuming device may be a pure electric vehicle, a hybrid electric vehicle, a plug-in hybrid electric vehicle or the like. In order to meet the requirements of the power consuming device for a high power and a high energy density of a secondary battery, a battery pack or a battery module may be used.

Specific Examples of New Positive Electrode Active Material

Hereinafter, the examples of the present application will be explained. The examples described below are exemplary and are merely for explaining the present application, and should not be construed as limiting the present application. The examples in which techniques or conditions are not specified are based on the techniques or conditions described in documents in the art or according to the product introduction. The reagents or instruments used therein for which manufacturers are not specified are all conventional products that are commercially available. The content of each component in the examples of the present disclosure is based on the dry mass without crystal water, unless otherwise stated.

The sources of the raw materials involved in the examples of the present application are as follows:

| Name | Chemical formula | Manufacturer | Specification |
|---|---|---|---|
| Manganese carbonate | $MnCO_3$ | Shandong Xiya Chemical Industry Co., Ltd. | 1 Kg |
| Lithium carbonate | $Li_2CO_3$ | Shandong Xiya Chemical Industry Co., Ltd. | 1 Kg |
| Magnesium carbonate | $MgCO_3$ | Shandong Xiya Chemical Industry Co., Ltd. | 1 Kg |
| Zinc carbonate | $ZnCO_3$ | Wuhan Xinru Chemical Co., Ltd. | 25 Kg |
| Ferrous carbonate | $FeCO_3$ | Xi'an Lanzhiguang Fine Materials Co., Ltd. | 1 Kg |
| Nickel sulfate | $NiCO_3$ | Shandong Xiya Chemical Industry Co., Ltd. | 1 Kg |
| Titanium sulfate | $Ti(SO_4)2$ | Shandong Xiya Chemical Industry Co., Ltd. | 1 Kg |
| Cobalt sulfate | $CoSO_4$ | Xiamen Zhixin Chemical Co., Ltd. | 500 g |
| Vanadium dichloride | $VCl_2$ | Shanghai Jinjinle Industrial Co., Ltd. | 1 Kg |
| Oxalic acid dihydrate | $C_2H_2O_4 \cdot 2H_2O$ | Shanghai Jinjinle Industrial Co., Ltd. | 1 Kg |
| Ammonium dihydrogen phosphate | $NH_4H_2PO_4$ | Shanghai Chengshao Biotechnology Co., Ltd. | 500 g |
| Sucrose | $C_{12}H_{22}O_{11}$ | Shanghai Yuanye Biotechnology Co., Ltd. | 100 g |
| Sulfuric acid | $H_2SO_4$ | Shenzhen Hisian Biotechnology Co., Ltd. | Mass fraction 60% |
| Nitric acid | $HNO_3$ | Anhui Lingtian Fine Chemical Co., Ltd. | Mass fraction 60% |

-continued

| Name | Chemical formula | Manufacturer | Specification |
| --- | --- | --- | --- |
| Siliceous acid | $H_2SiO_3$ | Shanghai Yuanye Biotechnology Co., Ltd. | 100 g |
| Boric acid | $H_3BO_3$ | Changzhou Qidi Chemical Co., Ltd. | 1 Kg |

Example 1-1

[Preparation of Lithium Manganese Phosphate Double-Coated Positive Electrode Active Material]

(1) Preparation of Co-Doped Lithium Manganese Phosphate Inner Core

Preparation of Fe, Co and V co-doped manganese oxalate: 689.5 g of manganese carbonate (in $MnCO_3$, the same below), 455.2 g of ferrous carbonate (in $FeCO_3$, the same below), 4.6 g of cobalt sulfate (in $CoSO_4$, the same below) and 4.9 g of vanadium dichloride (in $VCl_2$, the same below) are mixed thoroughly for 6 hours in a mixer. The mixture is transferred into a reaction kettle, and 5 L of deionized water and 1260.6 g of oxalic acid dihydrate (in $C_2H_2O_4 \cdot 2H_2O$, the same below) are added. The reaction kettle is heated to stirring is performed for 6 hours at a rotation speed of 600 rpm until the reaction is completed (no bubbles are generated), so as to obtain an Fe, Co, V and S co-doped manganese oxalate suspension. Then, the suspension is filtered, and the resulting filter cake is dried at 120° C. and then ground, so as to obtain Fe, Co, and V co-doped manganese oxalate dihydrate particles with a median particle size Dv50 of 100 nm.

Preparation of Fe, Co, V and S co-doped lithium manganese phosphate: Manganese oxalate dihydrate particles (1793.4 g) obtained in the previous step, 369.0 g of lithium carbonate (in $Li_2CO_3$, the same below), 1.6 g of 60% dilute sulfuric acid (in 60% $H_2SO_4$, the same below) and 1148.9 g of ammonium dihydrogen phosphate (in $NH_4H_2PO_4$, the same below) are added to 20 L of deionized water, and the mixture is stirred for 10 hours for mixing uniformly, so as to obtain a slurry. The slurry is transferred into a spray drying apparatus for spray-drying granulation, where the drying temperature is set at 250° C. and the drying time is 4 h, so as to obtain a powder. The above powder is sintered at 700° C. for 4 hours in a protective atmosphere of nitrogen (90% by volume)+hydrogen (10% by volume), so as to obtain 1572.1 g of Fe, Co, V and S co-doped lithium manganese phosphate.

(2) Preparation of Lithium Iron Pyrophosphate and Lithium Iron Phosphate

Preparation of lithium iron pyrophosphate powder: 4.77 g of lithium carbonate, 7.47 g of ferrous carbonate, 14.84 g of ammonium dihydrogen phosphate and 1.3 g of oxalic acid dihydrate are dissolved in 50 ml of deionized water. The pH of the mixture is 5, and stirring is performed for 2 hours such that the reaction mixture is fully reacted. Then, the reacted solution is heated to 80° C. and kept at this temperature for 4 hours to obtain a suspension of $Li_2FeP_2O_7$, which is filtered, washed with deionized water, and dried at 120° C. for 4 hours to obtain a powder. The powder is sintered at 650° C. under a nitrogen atmosphere for 8 h, cooled naturally to room temperature and then ground to obtain a $Li_2FeP_2O_7$ powder.

Preparation of lithium iron phosphate suspension: 11.1 g of lithium carbonate, 34.8 g of ferrous carbonate, 34.5 g of ammonium dihydrogen phosphate, 1.3 g of oxalic acid dihydrate and 74.6 g of sucrose (in $C_{12}H_{22}O_{11}$, the same below) are dissolved in 150 ml of deionized water to obtain a mixture, and then stirring is performed for 6 hours such that the mixture is fully reacted. Then, the reacted solution is heated to 120° C. and kept at this temperature for 6 hours to obtain a suspension of $LiFePO_4$.

(3) Coating 1572.1 g of the above Fe, Co, V and S co-doped lithium manganese phosphate and 15.72 g of the above lithium iron pyrophosphate ($Li_2FeP_2O_7$) powder are added into the suspension of lithium iron phosphate ($LiFePO_4$) prepared in the previous step, stirred and mixed uniformly, then transferred to a vacuum oven and dried at 150° C. for 6 h. The resulting product is then dispersed by sanding. After dispersion, the obtained product is sintered at 700° C. under a nitrogen atmosphere for 6 hours to obtain the target product of double-coated lithium manganese phosphate.

[Preparation of Positive Electrode Plate]

The double-coated lithium manganese phosphate positive electrode active material prepared above, a conductive agent acetylene black and a binder polyvinylidene fluoride (PVDF) are added to N-methylpyrrolidone (NMP) in a weight ratio of 92:2.5:5.5, followed by stirring and uniformly mixing to obtain a positive electrode slurry. The positive electrode slurry is uniformly coated onto an aluminum foil in 0.280 g/1540.25 $mm^2$, followed by drying, cold pressing, and slitting to obtain the positive electrode plate.

[Preparation of Negative Electrode Plate]

Negative electrode active materials artificial graphite and hard carbon, a conductive agent acetylene black, a binder styrene butadiene rubber (SBR) and a thickening agent sodium carboxymethylcellulose (CMC-Na) are dissolved in deionized water in a weight ratio of 90:5:2:2:1, followed by stirring and uniformly mixing to prepare a negative electrode slurry. The negative electrode slurry is uniformly coated onto a negative electrode current collector copper foil in 0.117 g/1540.25 $mm^2$, followed by drying, cold pressing, and slitting to obtain the negative electrode plate.

[Preparation of Electrolyte Solution]

In an argon atmosphere glove box ($H_2O<0.1$ ppm, and $O_2<0.1$ ppm), the organic solvents ethylene carbonate (EC)/ethyl methyl carbonate (EMC) are mixed uniformly in a volume ratio of 3/7, and 12.5 wt % (on the basis of the weight of the organic solvent) of $LiPF_6$ is dissolved in the above organic solvent and stirred uniformly to obtain the electrolyte solution.

[Separator]

A commercially available PP-PE copolymer microporous film having a thickness of 20 μm and an average pore size of 80 nm (Model 20, from Zhuogao Electronic Technology Co. Ltd.) is used.

[Preparation of Full Batter]

The above obtained positive electrode plate, separator and negative electrode plate are stacked in sequence, such that the separator is located between the positive electrode plate and the negative electrode plate to function for isolation, and are then wound to obtain a bare cell. The bare cell is placed in an outer package, injected with the above electrolyte solution and packaged to obtain a full battery.

[Preparation of Button Battery]

The double-coated lithium manganese phosphate positive electrode active material prepared above, PVDF and acetylene black are added into NMP in the weight ratio of 90:5:5, and stirred in a drying room to make a slurry. An aluminum foil is coated with the above slurry, followed by drying and cold pressing, so as to obtain a positive electrode plate. The coating amount is 0.02 g/$cm^2$, and the compacted density is 2.0 g/$cm^3$.

A lithium plate is used as a negative electrode, a solution of 1 mol/L $LiPF_6$ in ethylene carbonate (EC)+diethyl carbonate (DEC)+dimethyl carbonate (DMC) in a volume ratio of 1:1:1 is used as an electrolyte solution, and the lithium plate and the electrolyte solution are assembled, together with the positive electrode plate prepared above, into a button battery in a button battery box.

Examples 1-2 to 1-6

In the preparation process of the co-doped lithium manganese phosphate inner core, except that vanadium dichloride and cobalt sulfate are not used, and 463.4 g of ferrous carbonate, 1.6 g of 60% dilute sulfuric acid, 1148.9 g of ammonium dihydrogen phosphate and 369.0 g of lithium carbonate are used, the preparation conditions of the lithium manganese phosphate inner core in examples 1-2 to 1-6 are the same as in example 1-1.

In addition, in the preparation process of lithium iron pyrophosphate and lithium iron phosphate and in the process of coating the first coating layer and the second coating layer, except that the raw materials used are adjusted correspondingly according to the ratio of the coating amount shown in Table 1 to the coating amount corresponding to example 1-1, such that the amount of $Li_2FeP_2O_7$/$LiFePO_4$ in examples 1-2 to 1-6 is 12.6 g/37.7 g, 15.7 g/47.1 g, 18.8 g/56.5 g, 22.0/66.0 g and 25.1 g/75.4 g, respectively, and the amount of sucrose in the Examples 1-2 to 1-6 is 37.3 g, other conditions are the same as in example 1-1.

Examples 1-7 to 1-10

Except that the amounts of sucrose are 74.6 g, 149.1 g, 186.4 g and 223.7 g, respectively, such that the corresponding coating amounts of the carbon layer as the second coating layer are 31.4 g, 62.9 g, 78.6 g and 94.3 g, respectively, the conditions of examples 1-7 to 1-10 are the same as in example 1-3.

Examples 1-11 to 1-14

In the preparation process of lithium iron pyrophosphate and lithium iron phosphate, except that the amounts of the raw materials are adjusted correspondingly according to the coating amount shown in Table 1, such that the amount of $Li_2FeP_2O_7$/$LiFePO_4$ is 23.6 g/39.3 g, 31.4 g/31.4 g, 39.3 g/23.6 g and 47.2 g/15.7 g, respectively, the conditions of examples 1-11 to 1-14 are the same as in example 1-7.

Example 1-15

In the preparation process of co-doped lithium manganese phosphate inner core, except that iron ferrous carbonate is replaced by 492.80 g of $ZnCO_3$, the conditions of example 1-15 are the same as in example 1-14.

Examples 1-16 to 1-18

Except that in the preparation process of co-doped lithium manganese phosphate inner core of example 1-16, ferrous carbonate is replaced by 466.4 g of $NiCO_3$, 5.0 g of zinc carbonate and 7.2 g of titanium sulfate; except that in the preparation process of co-doped lithium manganese phosphate inner core of example 1-17, 455.2 g of ferrous carbonate and 8.5 g of vanadium dichloride are used; and except that in the preparation process of co-doped lithium manganese phosphate inner core of example 1-18, 455.2 g of ferrous carbonate, 4.9 g of vanadium dichloride and 2.5 g of magnesium carbonate are used, the conditions of examples 1-17 to 1-19 are the same as in example 1-7.

Examples 1-19 to 1-20

Except that in the preparation process of co-doped lithium manganese phosphate inner core of example 1-19, 369.4 g of lithium carbonate is used, and dilute sulfuric acid is replaced by 1.05 g of 60% dilute nitric acid; and except that in the preparation process of co-doped lithium manganese phosphate inner core of example 1-20, 369.7 g of lithium carbonate is used, and dilute sulfuric acid is replaced by 0.78 g of siliceous acid, the conditions of examples 1-19 to 1-20 are the same as in example 1-18.

Examples 1-21 to 1-22

Except that in the preparation process of co-doped lithium manganese phosphate inner core of example 1-21, 632.0 g of manganese carbonate, 463.30 g of ferrous carbonate, 30.5 g of vanadium dichloride, 21.0 g of magnesium carbonate and 0.78 g of siliceous acid are used; and except that in the preparation process of co-doped lithium manganese phosphate inner core of example 1-22, 746.9 g of manganese carbonate, 289.6 g of ferrous carbonate, 60.9 g of vanadium dichloride, 42.1 g of magnesium carbonate and 0.78 g of siliceous acid are used, the conditions of examples 1-21 to 1-22 are the same as in example 1-20.

Examples 1-23 to 1-24

Except that in the preparation process of co-doped lithium manganese phosphate inner core of example 1-23, 804.6 g of manganese carbonate, 231.7 g of ferrous carbonate, 1156.2 g of ammonium dihydrogen phosphate, 1.2 g of boric acid (with a mass fraction of 99.5%) and 370.8 g of lithium carbonate are used; and except that in the preparation process of co-doped lithium manganese phosphate inner core of example 1-24, 862.1 g of manganese carbonate, 173.8 g of ferrous carbonate, 1155.1 g of ammonium dihydrogen phosphate, 1.86 g of boric acid (with a mass fraction of 99.5%) and 371.6 g of lithium carbonate are used, the conditions of examples 1-23 to 1-24 are the same as in example 1-22.

Example 1-25

Except that in the preparation process of co-doped lithium manganese phosphate inner core of example 1-25, except that 370.1 g of manganese carbonate, 1.56 g of siliceous acid and 1147.7 g of ammonium dihydrogen phosphate are used, the conditions of example 1-25 are the same as in example 1-20.

Example 1-26

Except that in the preparation process of co-doped lithium manganese phosphate inner core of example 1-26, 368.3 g of lithium carbonate, 4.9 g of 60% dilute sulfuric acid, 919.6 g of manganese carbonate, 224.8 g of ferrous carbonate, 3.7 g of vanadium dichloride, 2.5 g of magnesium carbonate and 1146.8 g of ammonium dihydrogen phosphate are used, the conditions of example 1-26 are the same as in example 1-20.

Example 1-27

Except that in the preparation process of co-doped lithium manganese phosphate inner core of example 1-27, 367.9 g of lithium carbonate, 6.5 g of 60% dilute sulfuric acid and 1145.4 g of ammonium dihydrogen phosphate are used, the conditions of example 1-27 are the same as in example 1-20.

Examples 1-28 to 1-33

Except that in the preparation process of co-doped lithium manganese phosphate inner core of examples 1-28 to 1-33, 1034.5 g of manganese carbonate, 108.9 g of ferrous carbonate, 3.7 g of vanadium dichloride and 2.5 g of magnesium carbonate are used; the amounts of lithium carbonate are respectively: 367.6 g, 367.2 g, 366.8 g, 366.4 g, 366.0 g and 332.4 g; the amounts of ammonium dihydrogen phosphate are respectively: 1144.5 g, 1143.4 g, 1142.2 g, 1141.1 g, 1139.9 g and 1138.8 g; and the amounts of 60% dilute sulfuric acid are respectively: 8.2 g, 9.8 g, 11.4 g, 13.1 g, 14.7 g and 16.3 g, the conditions of examples 1-28 to 1-33 are the same as in example 1-20.

Examples 2-1 to 2-4

Example 2-1

Except that in the preparation process of lithium iron pyrophosphate ($Li_2FeP_2O_7$), in the powder sintering step, the sintering temperature is 550° C. and the sintering time is 1 h to control the crystallinity of $Li_2FeP_2O_7$ to be 30%; and except that in the preparation process of lithium iron phosphate ($LiFePO_4$), in the coating sintering step, the sintering temperature is 650° C. and the sintering time is 2 h to control the crystallinity of $LiFePO_4$ to be 30%, other conditions are the same as in example 1-1.

Example 2-2

Except that in the preparation process of lithium iron pyrophosphate ($Li_2FeP_2O_7$), in the powder sintering step, the sintering temperature is 550° C. and the sintering time is 2 h to control the crystallinity of $Li_2FeP_2O_7$ to be 50%; and except that in the preparation process of lithium iron phosphate ($LiFePO_4$), in the coating sintering step, the sintering temperature is 650° C. and the sintering time is 3 h to control the crystallinity of $LiFePO_4$ to be 50%, other conditions are the same as in example 1-1.

Example 2-3

Except that in the preparation process of lithium iron pyrophosphate ($Li_2FeP_2O_7$), in the powder sintering step, the sintering temperature is 600° C. and the sintering time is 3 h to control the crystallinity of $Li_2FeP_2O_7$ to be 70%; and except that in the preparation process of lithium iron phosphate ($LiFePO_4$), in the coating sintering step, the sintering temperature is 650° C. and the sintering time is 4 h to control the crystallinity of $LiFePO_4$ to be 70%, other conditions are the same as in example 1-1.

Example 2-4

Except that in the preparation process of lithium iron pyrophosphate ($Li_2FeP_2O_7$), in the powder sintering step, the sintering temperature is 650° C. and the sintering time is 4 h to control the crystallinity of $Li_2FeP_2O_7$ to be 100%; and except that in the preparation process of lithium iron phosphate ($LiFePO_4$), in the coating sintering step, the sintering temperature is 700° C. and the sintering time is 6 h to control the crystallinity of $LiFePO_4$ to be 100%, other conditions are the same as in example 1-1.

Examples 3-1 to 3-12

Except that in the preparation process of Fe, Co, and V co-doped manganese oxalate particles, the heating temperature/stirring time in the reaction kettle in example 3-1 is 60° C./120 min; the heating temperature/stirring time in the reaction kettle in example 3-2 is respectively 70° C./120 min; the heating temperature/stirring time in the reaction kettle in example 3-3 is respectively 80° C./120 min; the heating temperature/stirring time in the reaction kettle in example 3-4 is respectively 90° C./120 min; the heating temperature/stirring time in the reaction kettle in example 3-5 is respectively 100° C./120 min; the heating temperature/stirring time in the reaction kettle in example 3-6 is respectively 110° C./120 min; the heating temperature/stirring time in the reaction kettle in example 3-7 is respectively 120° C./120 min; the heating temperature/stirring time in the reaction kettle in example 3-8 is respectively 130° C./120 min; the heating temperature/stirring time in the reaction kettle in example 3-9 is respectively 100° C./60 min; the heating temperature/stirring time in the reaction kettle in example 3-10 is respectively 100° C./90 min; the heating temperature/stirring time in the reaction kettle in example 3-11 is respectively 100° C./150 min; and the heating temperature/stirring time in the reaction kettle in example 3-12 is respectively 100° C./180 min, other conditions of examples 3-1 to 3-12 are the same as in example 1-1.

Examples 4-1 to 4-7

Examples 4-1 to 4-4: Except that in the preparation process of lithium iron pyrophosphate ($Li_2FeP_2O_7$), in the drying step, the drying temperature/drying time is 100° C./4 h, 150° C./6 h, 200° C./6 h and 200° C./6 h, respectively; and except that in the preparation process of lithium iron pyrophosphate ($Li_2FeP_2O_7$), in the sintering step, the sintering temperature and sintering time are 700° C./6 h, 700° C./6 h, 700° C./6 h and 600° C./6 h, respectively, other conditions are the same as in example 1-7.

Examples 4-5 to 4-7: Except that in the coating process, the drying temperature/drying time in the drying step is 150° C./6 h, 150° C./6 h and 150° C./6 h, respectively; and except that in the coating process, the sintering temperature and sintering time in the sintering step are 600° C./4 h, 600° C./6 h and 800° C./8 h, respectively, other conditions are the same as in example 1-12.

Comparative Example 1

Preparation of manganese oxalate: 1149.3 g of manganese carbonate is added into a reaction kettle, and 5 L of deionized water and 1260.6 g of oxalic acid dihydrate (in $C_2H_2O_4 \cdot 2H_2O$, the same below) are added. The reaction kettle is heated to 80° C., stirring is performed for 6 hours at a rotation speed of 600 rpm until the reaction is completed (no bubbles are generated), so as to obtain a manganese oxalate suspension. Then, the suspension is filtered, and the resulting filter cake is dried at 120° C. and then ground to obtain manganese oxalate dihydrate particles with a median particle size Dv50 of 100 nm.

Preparation of carbon-coated lithium manganese phosphate: 1789.6 g of manganese oxalate dihydrate particles obtained above, 369.4 g of lithium carbonate (in $Li_2CO_3$, the same below), 1150.1 g of ammonium dihydrogen phosphate (in $NH_4H_2PO_4$, the same below) and 31 g of sucrose (in $C_{12}H_{22}O_{11}$, the same below) are added to 20 L of deionized water, and the mixture is stirred for 10 hours to be uniformly mixed, so as to obtain a slurry. The slurry is transferred into a spray drying apparatus for spray-drying granulation, where the drying temperature is set at 250° C. and the drying time is 4 h, so as to obtain a powder. The above powder is sintered at 700° C. for 4 hours in a protective atmosphere of nitrogen (90% by volume)+hydrogen (10% by volume), so as to obtain carbon doped lithium manganese phosphate.

Comparative Example 2

Except that 689.5 g of manganese carbonate is used and 463.3 g of ferrous carbonate is additionally added, other conditions of comparative example 2 are the same as in comparative example 1.

Comparative Example 3

Except that 1148.9 g of ammonium dihydrogen phosphate and 369.0 g of lithium carbonate are used, and 1.6 g of 60% dilute sulfuric acid is additionally added, other conditions of comparative example 3 are the same as in comparative example 1.

Comparative Example 4

Except that 689.5 g of manganese carbonate, 1148.9 g of ammonium dihydrogen phosphate and 369.0 g of lithium carbonate are used, and 463.3 g of ferrous carbonate and 1.6 g of 60% dilute sulfuric acid are additionally added, other conditions of comparative example 4 are the same as in comparative example 1.

Comparative Example 5

Except for the following additional steps: preparation of lithium iron pyrophosphate powder: 9.52 g of lithium carbonate, 29.9 g of ferrous carbonate, 29.6 g of ammonium dihydrogen phosphate and 32.5 g of oxalic acid dihydrate are dissolved in 50 ml of deionized water; the pH of the mixture is 5, and stirring is performed for 2 hours such that the reaction mixture is fully reacted; then, the reacted solution is heated to 80° C. and kept at this temperature for 4 hours to obtain a suspension of $Li_2FeP_2O_7$, which is filtered, washed with deionized water, and dried at 120° C. for 4 hours to obtain a powder; the powder is sintered at 500° C. under a nitrogen atmosphere for 4 h, and then ground after cooling to room temperature naturally to control the crystallinity of $Li_2FeP_2O_7$ to be 5%; and when preparing a carbon-coated material, the amount of $Li_2FeP_2O_7$ is 62.8 g, other conditions of comparative example 5 are the same as comparative example 4.

Comparative Example 6

Except for the following additional steps: preparation of lithium iron phosphate suspension: 14.7 g of lithium carbonate, 46.1 g of ferrous carbonate, 45.8 g of ammonium dihydrogen phosphate and 50.2 g of oxalic acid dihydrate are dissolved in 500 ml of deionized water, and then stirred for 6 hours such that the mixture is fully reacted; then, the reacted solution is heated to 120° C. and kept at this temperature for 6 hours to obtain a $LiFePO_4$ suspension; in the preparation process of lithium iron phosphate ($LiFePO_4$), the sintering temperature is 600° C. and the sintering time is 4 hours in the coating sintering step to control the crystallinity of $LiFePO_4$ to be 8%; and when preparing a carbon-coated material, the amount of $LiFePO_4$ is 62.8 g, other conditions of comparative example 6 are the same as comparative example 4.

Comparative Example 7

Preparation of lithium iron pyrophosphate powder: 2.38 g of lithium carbonate, 7.5 g of ferrous carbonate, 7.4 g of ammonium dihydrogen phosphate and 8.1 g of oxalic acid dihydrate are dissolved in 50 ml of deionized water. The pH of the mixture is 5, and stirring is performed for 2 hours such that the reaction mixture is fully reacted. Then, the reacted solution is heated to 80° C. and kept at this temperature for 4 hours to obtain a suspension of $Li_2FeP_2O_7$, which is filtered, washed with deionized water, and dried at 120° C. for 4 hours to obtain a powder. The powder is sintered at 500° C. under a nitrogen atmosphere for 4 h, cooled naturally to room temperature and then ground to control the crystallinity of $Li_2FeP_2O_7$ to be 5%.

Preparation of lithium iron phosphate suspension: Except that 11.1 g of lithium carbonate, 34.7 g of ferrous carbonate, 34.4 g of ammonium dihydrogen phosphate, 37.7 g of oxalic acid dihydrate and 37.3 g of sucrose (in $C_{12}H_{22}O_{11}$, the same below) are dissolved in 1500 ml of deionized water, and then stirred for 6 hours such that the mixture is fully reacted; then, the reacted solution is heated to 120° C. and kept at this temperature for 6 hours to obtain a suspension of $LiFePO_4$.

15.7 g of the obtained lithium iron pyrophosphate powder is added to the above lithium iron phosphate ($LiFePO_4$) and sucrose suspension; and in the preparation process, the sintering temperature is 600° C. and the sintering time is 4 h in the coating sintering step to control the crystallinity of $LiFePO_4$ to be 8%, other conditions of comparative example 7 are the same as in comparative example 4, and amorphous lithium iron pyrophosphate, amorphous lithium iron phosphate, and the carbon-coated positive electrode active material are obtained.

Comparative Examples 8-11

Except that in the preparation process of lithium iron pyrophosphate ($Li_2FeP_2O_7$), in comparative examples 8-10, the drying temperature/drying time in the drying step is 80° C./3 h, 80° C./3 h and 80° C./3 h, respectively; in the preparation process of lithium iron pyrophosphate ($Li_2FeP_2O_7$), in comparative examples 8-10, the sintering temperature/sintering time in the sintering step is 400° C./3 h, 400° C./3 h and 350° C./2 h, respectively; in comparative example 11, in the preparation process of lithium iron phosphate ($LiFePO_4$), the drying temperature/drying time in the drying step is 80° C./3 h; and in comparative examples 8-11, the amount of $Li_2FeP_2O_7/LiFePO_4$ is 47.2 g/15.7 g, 15.7 g/47.2 g, 62.8 g/0 g, and 0 g/62.8 g, respectively, other conditions are the same as in example 1-7.

The [Preparation of positive electrode plate], [Preparation of negative electrode plate], [Preparation of electrolyte solution], [Preparation of separator] and [Preparation of battery] of the above examples and comparative examples are all the same as in example 1-1.

Measurement for Associated Parameters

1. Measurement for Initial Gram Capacity of Button Battery:

At 2.5 to 4.3 V, a button battery prepared as above is charged at 0.1C to 4.3 V, then charged at a constant voltage of 4.3 V until the current is less than or equal to 0.05 mA, allowed to stand for 5 min, and then discharged at 0.1C to 2.0 V; and the discharge capacity at this moment is the initial gram capacity, marked as D0.

2. Average Discharge Voltage (V) Test of Button Battery:

The button battery prepared above is allowed to stand for 5 min at a constant temperature of 25° C., discharged at 0.1C to 2.5 V, allowed to stand for 5 min, charged at 0.1C to 4.3 V, and then charged at a constant voltage of 4.3 V until the current is less than or equal to 0.05 mA, and allowed to stand for 5 min; then the button battery is discharged at 0.1C to 2.5 V, and the discharge capacity at this moment is the initial gram capacity, which is recorded as D0; the discharge energy is the initial energy, which is recorded as E0; and the average discharge voltage V of the button battery is E0/D0.

3. Test of Expansion of Full Battery at 60° C.:

At 60° C., a full battery at 100% SOC (State of Charge) as prepared above is stored. Before and after and during the storage, the open-circuit voltage (OCV) and AC internal impedance (IMP) of a cell are measured for monitoring the SOC, and the volume of the cell is measured. Herein, the full battery is taken out after every 48 h of storage, and allowed to stand for 1 h, then the OCV and the IMP are measured, and the cell volume is measured by using the displacement method after the full battery is cooled to room temperature. The displacement method means that the gravity $F_1$ of the cell is measured separately using a balance of which the on-board data is subjected to automatic unit conversion, then the cell is completely placed in deionized water (with a density known as 1 $g/cm^3$), the gravity $F_2$ of the cell at this moment is measured, the buoyancy $F_{buoyancy}$ on the cell is $F_1-F_2$, and then the cell volume is calculated as $V=(F_1-F_2)/(\rho \times g)$ according to the Archimedes principle $F_{buoyancy}=\rho \times g \times V_{displacement}$.

From the test results of OCV and IMP, the batteries of all examples always maintain a SOC of no less than 99% in the experimental process till the end of the storage.

After 30 days of storage, the cell volume is measured, and a percentage increase in cell volume after the storage relative to the cell volume before the storage is calculated.

In addition, residual capacity of the cell is measured. At 2.5 to 4.3 V, the full battery is charged at 1C to 4.3 V, and then charged at a constant voltage of 4.3 V until the current is less than or equal to 0.05 mA. The full battery is allowed to stand for 5 min, and the charge capacity at this moment is recorded as the residual capacity of the cell.

4. Test of Cycling Performance of Full Battery at 45° C.:

In a constant-temperature environment at 45° C., at 2.5 to 4.3 V, a full battery as prepared above is charged at 1C to 4.3 V, and then charged at a constant voltage of 4.3 V until the current is less than or equal to 0.05 mA. The full battery is allowed to stand for 5 min, and then discharged at 1C to 2.5 V, and the discharge capacity at this moment is recorded as D0. The above-mentioned charge/discharge cycle is repeated until the discharge capacity is reduced to 80% of D0. The number of cycles experienced by the battery at this moment is recorded.

5. Test of Lattice Change Rate:

In a constant-temperature environment at 25° C., a positive electrode active material sample as prepared above is placed in XRD (model: Bruker D8 Discover) and tested at 1°/min, and the test data are organized and analyzed; and with reference to the standard PDF card, lattice constants a0, b0, c0 and v0 at this moment are calculated (a0, b0 and c0 represent the lengths of a unit cell on all sides, and v0 represents the volume of the unit cell, which may be obtained directly from XRD refinement results).

By using the method for preparing a button battery above, the positive electrode active material sample is made into a button battery, and the button battery is charged at a small rate of 0.05C until the current is reduced to 0.01C. Then a positive electrode plate in the button battery is taken out and soaked in dimethyl carbonate (DMC) for 8 h. Then the positive electrode plate is dried, powder is scraped off, and particles with a particle size of less than 500 nm are screened out. Sampling is performed, and a cell volume v1 is calculated in the same way as that for testing the fresh sample as described above. $(v0-v1)/v0 \times 100\%$ is shown in the table as a lattice change rate (cell volume change rate) of the sample before and after complete lithium intercalation and de-intercalation.

6. Li/Mn Antisite Defect Concentration Test:

The XRD results determined in the "Method for measuring lattice change rate" are compared with the PDF (Powder Diffraction File) card of a standard crystal, so as to obtain a Li/Mn antisite defect concentration. Specifically, the XRD results determined in the "Method for measuring lattice change rate" are imported into a general structure analysis system (GSAS) software, and refinement results are obtained automatically, including the occupancies of different atoms; and a Li/Mn antisite defect concentration is obtained by reading the refinement results.

7. Transition Metal Dissolution Test:

A full battery after cycling to 80% attenuated capacity at 45° C. is discharged to a cut-off voltage of 2.0 V at a rate of 0.1C. Then the battery is disassembled, a negative electrode plate is taken out, a round piece of 30 unit areas (1540.25 $mm^2$) is randomly taken from the negative electrode plate, and inductively coupled plasma (ICP) emission spectroscopy is performed with Agilent ICP-OES730. The amounts of Fe (if the Mn position of the positive electrode active material is doped with Fe) and Mn therein are calculated according to the ICP results, and then the dissolution of Mn (and Fe doping the Mn position) after cycling is calculated. The testing standard is in accordance with EPA-6010D-2014.

8. Surface Oxygen Valence State Test:

5 g of a positive electrode active material prepared above is made into a button battery according to the method for preparing the above button battery. The button battery is charged at a small rate of 0.05C until the current is reduced to 0.01C. Then a positive electrode plate in the button battery is taken out and soaked in dimethyl carbonate (DMC) for 8 h. Then the positive electrode plate is dried, powder is scraped off, and particles with a particle size of less than 500 nm are screened out. The obtained particles are measured with electron energy loss spectroscopy (EELS, instrument model used: Talos F200S), so as to obtain an energy loss near-edge structure (ELNES) which reflects the density of states and energy level distribution of an element. According to the density of states and energy level distribution, the number of occupied electrons is calculated by integrating the data of valence-band density of states, and then a valence state of surface oxygen after the charging is extrapolated.

9. Measurement for Compacted Density:

5 g of positive electrode active material powder prepared above is put into a compaction dedicated mold (U.S. CARVER mold, model: 13 mm), and then the mold is placed on a compacted density instrument. A pressure of 3T is exerted, the thickness (after pressure relief, the area of the container for measurement is 1540.25 $mm^2$) of the powder under pressure is read from the instrument, and a compacted density is calculated through $\rho = m/v$.

10. Test of the Crystallinity of Pyrophosphate and Phosphate by X-Ray Diffraction 5 g of the positive electrode active material powder prepared above is taken and measured for total scattering intensity by X-rays, which is the sum of the scattering intensity of the entire space material, and is only related to the intensity of the primary ray, the chemical structure, and the total number of electrons participating in the diffraction, that is, the mass, but has nothing to do with the order of the sample; then the crystalline scattering and non-crystalline scattering are separated from the diffraction pattern, and the degree of crystallinity is the ratio of the scattering of the crystalline part to the total intensity of the scattering.

11. Interplanar Spacing and Angle 1 g of each positive electrode active material powder prepared above is placed in a 50 mL test tube, and 10 mL of alcohol with a mass fraction of 75% is injected into the test tube, then fully stirred and dispersed for 30 min, and then a clean disposable plastic straw is used to take an appropriate amount of the solution, which is dripped on a 300-mesh copper mesh, at this moment, part of the powder will remain on the copper mesh. The copper mesh and the sample are transferred to TEM (Tabs F200s G2) sample chamber for testing, the original picture of the TEM test is obtained and the original picture format (xx.dm3) is saved.

The original picture obtained from the above TEM test is opened in DigitalMicrograph software, and Fourier transform (automatically completed by the software after the clicking operation) is performed to obtain a diffraction pattern, and the distance from the diffraction spot to the center position in the diffraction pattern is measured to obtain the interplanar spacing, and the angle is calculated according to the Bragg equation.

TABLE 1

Performance test results of examples 1-1 to 1-33 and comparative examples 1-7

| Example No. | Inner core | First coating layer | Second coating layer | Lattice change rate (%) | Li/Mn antisite defect concentration/ % | Dissolution of Fe and Mn after cycling (ppm) | Surface oxygen valence state | Gram capacity of button battery at 0.1 C. (mAh/g) | Average discharge voltage of button battery (V) | Expansion of cell when stored at 60° C. for 30 d (%) | Number of cycles corresponding to 80% capacity retention rate at 45° C. |
|---|---|---|---|---|---|---|---|---|---|---|---|
| Example 1-1 | $Li_{0.999}Mn_{0.60}Fe_{0.393}V_{0.004}Co_{0.003}P_{0.999}S_{0.001}O_4$ | 1% $Li_2FeP_2O_7$/ 3% $LiFePO_4$ | 2% of carbon | 2.4 | 0.4 | 8 | −1.98 | 158.2 | 3.78 | 1.9 | 1328 |
| Example 1-2 | $Li_{0.999}Mn_{0.60}Fe_{0.40}P_{0.999}S_{0.001}O_4$ | 0.8% $Li_2FeP_2O_7$/ 2.4% $LiFePO_4$ | 1% of carbon | 6.6 | 1.2 | 63 | −1.97 | 148.9 | 3.75 | 6.4 | 804 |
| Example 1-3 | $Li_{0.999}Mn_{0.60}Fe_{0.40}P_{0.999}S_{0.001}O_4$ | 1% $Li_2FeP_2O_7$/ 3% $LiFePO_4$ | 1% of carbon | 6.5 | 1.1 | 48 | −1.97 | 148.5 | 3.74 | 5.3 | 918 |
| Example 1-4 | $Li_{0.999}Mn_{0.60}Fe_{0.40}P_{0.999}S_{0.001}O_4$ | 1.2% $Li_2FeP_2O_7$/ 3.6% $LiFePO_4$ | 1% of carbon | 6.5 | 0.8 | 32 | −1.97 | 147.3 | 3.73 | 4.8 | 968 |
| Example 1-5 | $Li_{0.999}Mn_{0.60}Fe_{0.40}P_{0.999}S_{0.001}O_4$ | 1.4% $Li_2FeP_2O_7$/ 4.2% $LiFePO_4$ | 1% of carbon | 6.5 | 0.7 | 20 | −1.98 | 146.8 | 3.73 | 3.6 | 1064 |
| Example 1-6 | $Li_{0.999}Mn_{0.60}Fe_{0.40}P_{0.999}S_{0.001}O_4$ | 1.6% $Li_2FeP_2O_7$/ 4.8% $LiFePO_4$ | 1% of carbon | 6.6 | 0.6 | 15 | −1.98 | 145.9 | 3.72 | 2.8 | 1189 |
| Example 1-7 | $Li_{0.999}Mn_{0.60}Fe_{0.40}P_{0.999}S_{0.001}O_4$ | 1% $Li_2FeP_2O_7$/ 3% $LiFePO_4$ | 2% of carbon | 6.5 | 1.0 | 42 | −1.97 | 147.5 | 3.73 | 4.8 | 968 |
| Example 1-8 | $Li_{0.999}Mn_{0.60}Fe_{0.40}P_{0.999}S_{0.001}O_4$ | 1% $Li_2FeP_2O_7$/ 3% $LiFePO_4$ | 4% of carbon | 6.5 | 1.0 | 38 | −1.97 | 146.4 | 3.73 | 4.3 | 1012 |
| Example 1-9 | $Li_{0.999}Mn_{0.60}Fe_{0.40}P_{0.999}S_{0.001}O_4$ | 1% $Li_2FeP_2O_7$/ 3% $LiFePO_4$ | 5% of carbon | 6.4 | 1.1 | 29 | −1.98 | 144.3 | 3.73 | 3.7 | 1108 |
| Example 1-10 | $Li_{0.999}Mn_{0.60}Fe_{0.40}P_{0.999}S_{0.001}O_4$ | 1% $Li_2FeP_2O_7$/ 3% $LiFePO_4$ | 6% of carbon | 6.4 | 1.1 | 18 | −1.98 | 142.1 | 3.73 | 2.8 | 1219 |

TABLE 1-continued

Performance test results of examples 1-1 to 1-33 and comparative examples 1-7

| Example No. | Inner core | First coating layer | Second coating layer | Lattice change rate (%) | Li/Mn antisite defect concentration/ % | Dissolution of Fe and Mn after cycling (ppm) | Surface oxygen valence state | Gram capacity of button battery at 0.1 C. (mAh/g) | Average discharge voltage of button battery (V) | Expansion of cell when stored at 60° C. for 30 d (%) | Number of cycles corresponding to 80% capacity retention rate at 45° C. |
|---|---|---|---|---|---|---|---|---|---|---|---|
| Example 1-11 | $Li_{0.999}Mn_{0.60}Fe_{0.40}P_{0.999}S_{0.001}O_4$ | 1.5% $Li_2FeP_2O_7$/ 2.5% $LiFePO_4$ | 2% of carbon | 6.5 | 1.1 | 34 | −1.97 | 147.8 | 3.74 | 5.2 | 927 |
| Example 1-12 | $Li_{0.999}Mn_{0.60}Fe_{0.40}P_{0.999}S_{0.001}O_4$ | 2% $Li_2FeP_2O_7$/ 2% $LiFePO_4$ | 2% of carbon | 6.6 | 1.0 | 22 | −1.96 | 147.6 | 3.74 | 6.1 | 897 |
| Example 1-13 | $Li_{0.999}Mn_{0.60}Fe_{0.40}P_{0.999}S_{0.001}O_4$ | 2.5% $Li_2FeP_2O_7$/ 1.5% $LiFePO_4$ | 2% of carbon | 6.7 | 1.2 | 18 | −1.96 | 147.2 | 3.74 | 6.9 | 816 |
| Example 1-14 | $Li_{0.999}Mn_{0.60}Fe_{0.40}P_{0.999}S_{0.001}O_4$ | 3% $Li_2FeP_2O_7$/ 1% $LiFePO_4$ | 2% of carbon | 6.7 | 1.1 | 9 | −1.97 | 147.0 | 3.75 | 7.5 | 764 |
| Example 1-15 | $Li_{0.999}Mn_{0.60}Zn_{0.40}P_{0.999}S_{0.001}O_4$ | 3% $Li_2FeP_2O_7$/ 1% $LiFePO_4$ | 2% of carbon | 7.5 | 2.5 | 18 | −1.97 | 138.7 | 3.86 | 8.4 | 857 |
| Example 1-16 | $Li_{0.993}Mn_{0.6}Ni_{0.393}Zn_{0.004}Ti_{0.003}P_{0.999}S_{0.001}O_4$ | 1% $Li_2FeP_2O_7$/ 3% $LiFePO_4$ | 2% of carbon | 5.4 | 0.8 | 14 | −1.97 | 139.4 | 3.86 | 4.5 | 974 |
| Example 1-17 | $Li_{0.999}Mn_{0.60}Fe_{0.393}V_{0.007}P_{0.999}S_{0.001}O_4$ | 1% $Li_2FeP_2O_7$/ 3% $LiFePO_4$ | 2% of carbon | 4.2 | 0.6 | 13 | −1.97 | 153.2 | 3.78 | 3.2 | 1241 |
| Example 1-18 | $Li_{0.999}Mn_{0.60}Fe_{0.393}V_{0.004}Mg_{0.003}P_{0.999}S_{0.001}O_4$ | 1% $Li_2FeP_2O_7$/ 3% $LiFePO_4$ | 2% of carbon | 2.6 | 0.5 | 10 | −1.97 | 155.6 | 3.80 | 2.7 | 1245 |
| Example 1-19 | $LiMn_{0.60}Fe_{0.393}V_{0.004}Mg_{0.003}P_{0.999}N_{0.001}O_4$ | 1% $Li_2FeP_2O_7$/ 3% $LiFePO_4$ | 2% of carbon | 2.3 | 0.5 | 9 | −1.98 | 157.6 | 3.80 | 2.1 | 1349 |
| Example 1-20 | $Li_{1.001}Mn_{0.60}Fe_{0.393}V_{0.004}Mg_{0.003}P_{0.999}Si_{0.001}O_4$ | 1% $Li_2FeP_2O_7$/ 3% $LiFePO_4$ | 2% of carbon | 2.4 | 0.7 | 11 | −1.98 | 157.4 | 3.80 | 2.4 | 1368 |
| Example 1-21 | $Li_{1.001}Mn_{0.55}Fe_{0.40}V_{0.025}Mg_{0.025}P_{0.999}Si_{0.001}O_4$ | 1% $Li_2FeP_2O_7$/ 3% $LiFePO_4$ | 2% of carbon | 2.2 | 0.5 | 8 | −1.98 | 158.4 | 3.72 | 2.0 | 1459 |
| Example 1-22 | $Li_{1.001}Mn_{0.65}Fe_{0.25}V_{0.05}Mg_{0.05}P_{0.999}Si_{0.001}O_4$ | 1% $Li_2FeP_2O_7$/ 3% $LiFePO_4$ | 2% of carbon | 2.5 | 0.8 | 12 | −1.98 | 156.9 | 3.83 | 2.8 | 1283 |
| Example 1-23 | $Li_{1.004}Mn_{0.7}Fe_{0.2}V_{0.05}Mg_{0.05}P_{0.998}B_{0.002}O_4$ | 1% $Li_2FeP_2O_7$/ 3% $LiFePO_4$ | 2% of carbon | 2.6 | 0.8 | 11 | −1.98 | 157.1 | 3.83 | 2.5 | 1268 |
| Example 1-24 | $Li_{1.006}Mn_{0.75}Fe_{0.15}V_{0.05}Mg_{0.05}P_{0.997}B_{0.003}O_4$ | 1% $Li_2FeP_2O_7$/ 3% $LiFePO_4$ | 2% of carbon | 2.6 | 0.8 | 10 | −1.98 | 157.4 | 3.83 | 2.6 | 1329 |
| Example 1-25 | $Li_{1.002}Mn_{0.60}Fe_{0.393}V_{0.004}Mg_{0.003}P_{0.998}Si_{0.002}O_4$ | 1% $Li_2FeP_2O_7$/ 3% $LiFePO_4$ | 2% of carbon | 2.3 | 0.7 | 10 | −1.98 | 157.3 | 3.78 | 2.4 | 1369 |
| Example 1-26 | $Li_{0.997}Mn_{0.80}Fe_{0.194}V_{0.003}Mg_{0.003}P_{0.997}S_{0.003}O_4$ | 1% $Li_2FeP_2O_7$/ 3% $LiFePO_4$ | 2% of carbon | 2.8 | 0.9 | 12 | −1.98 | 156.1 | 3.85 | 2.9 | 1128 |
| Example 1-27 | $Li_{0.996}Mn_{0.60}Fe_{0.393}V_{0.004}Mg_{0.003}P_{0.996}S_{0.004}O_4$ | 1% $Li_2FeP_2O_7$/ 3% $LiFePO_4$ | 2% of carbon | 2.2 | 0.6 | 11 | −1.98 | 157.5 | 3.78 | 2.4 | 1394 |

TABLE 1-continued

Performance test results of examples 1-1 to 1-33 and comparative examples 1-7

| Example No. | Inner core | First coating layer | Second coating layer | Lattice change rate (%) | Li/Mn antisite defect concentration/ % | Dissolution of Fe and Mn after cycling (ppm) | Surface oxygen valence state | Gram capacity of button battery at 0.1 C. (mAh/g) | Average discharge voltage of button battery (V) | Expansion of cell when stored at 60° C. for 30 d (%) | Number of cycles corresponding to 80% capacity retention rate at 45° C. |
|---|---|---|---|---|---|---|---|---|---|---|---|
| Example 1-28 | $Li_{0.995}Mn_{0.9}Fe_{0.094}V_{0.003}Mg_{0.003}P_{0.995}S_{0.005}O_4$ | 1% $Li_2FeP_2O_7$/ 3% $LiFePO_4$ | 2% of carbon | 3.2 | 1.1 | 13 | −1.96 | 156.8 | 3.89 | 3.2 | 1089 |
| Example 1-29 | $Li_{0.994}Mn_{0.90}Fe_{0.094}V_{0.003}Mg_{0.003}P_{0.994}S_{0.006}O_4$ | 1% $Li_2FeP_2O_7$/ 3% $LiFePO_4$ | 2% of carbon | 3.0 | 1.2 | 14 | −1.95 | 156.1 | 3.89 | 3.2 | 1038 |
| Example 1-30 | $Li_{0.993}Mn_{0.90}Fe_{0.094}V_{0.003}Mg_{0.003}P_{0.993}S_{0.007}O_4$ | 1% $Li_2FeP_2O_7$/ 3% $LiFePO_4$ | 2% of carbon | 2.8 | 1.4 | 16 | −1.95 | 155.8 | 3.89 | 3.1 | 948 |
| Example 1-31 | $Li_{0.992}Mn_{0.90}Fe_{0.094}V_{0.003}Mg_{0.003}P_{0.992}S_{0.008}O_4$ | 1% $Li_2FeP_2O_7$/ 3% $LiFePO_4$ | 2% of carbon | 2.6 | 1.4 | 17 | −1.94 | 155.4 | 3.89 | 3.0 | 917 |
| Example 1-32 | $Li_{0.991}Mn_{0.90}Fe_{0.094}V_{0.003}Mg_{0.003}P_{0.991}S_{0.009}O_4$ | 1% $Li_2FeP_2O_7$/ 3% $LiFePO_4$ | 2% of carbon | 2.4 | 1.2 | 18 | −1.94 | 154.8 | 3.89 | 2.8 | 897 |
| Example 1-33 | $Li_{0.9}Mn_{0.90}Fe_{0.094}V_{0.003}Mg_{0.003}P_{0.9}S_{0.1}O_4$ | 1% $Li_2FeP_2O_7$/ 3% $LiFePO_4$ | 2% of carbon | 2.1 | 0.9 | 20 | −1.94 | 154.5 | 3.89 | 2.7 | 879 |
| Comparative example 1 | $LiMnPO_4$ | — | 1% of carbon | 11.4 | 3.2 | 2060 | −1.55 | 125.6 | 4.02 | 48.6 | 185 |
| Comparative example 2 | $LiMn_{0.60}Fe_{0.40}PO_4$ | — | 1% of carbon | 8.7 | 2.8 | 1597 | −1.76 | 134.8 | 3.76 | 42.5 | 358 |
| Comparative example 3 | $Li_{0.999}MnP_{0.999}S_{0.001}O_4$ | — | 1% of carbon | 9.8 | 2.5 | 1895 | −1.66 | 128.6 | 4.05 | 45.5 | 267 |
| Comparative example 4 | $Li_{0.999}Mn_{0.60}Fe_{0.40}P_{0.999}S_{0.001}O_4$ | — | 1% of carbon | 6.7 | 1.8 | 1279 | −1.83 | 140.5 | 3.78 | 38.5 | 417 |
| Comparative example 5 | $Li_{0.999}Mn_{0.60}Fe_{0.40}P_{0.999}S_{0.001}O_4$ | 4% of amorphous $Li_2FeP_2O_7$ | 1% of carbon | 6.5 | 1.8 | 208 | −1.90 | 140.3 | 3.73 | 12.5 | 519 |
| Comparative example 6 | $Li_{0.999}Mn_{0.60}Fe_{0.40}P_{0.999}S_{0.001}O_4$ | 4% of amorphous $LiFePO_4$ | 1% of carbon | 6.6 | 1.8 | 318 | −1.91 | 140.2 | 3.74 | 11.5 | 528 |
| Comparative example 7 | $Li_{0.999}Mn_{0.60}Fe_{0.40}P_{0.999}S_{0.001}O_4$ | 1% of amorphous $Li_2FeP_2O_7$ + 3% of amorphous $LiFePO_4$ | 1% of carbon | 6.6 | 1.8 | 174 | −1.90 | 140.1 | 3.75 | 8.6 | 682 |

*Note:
1) The crystallinity of $Li_2FeP_2O_7$ and $LiFePO_4$ in examples 1-1 to 1-33 are all 100%; and
2) in comparative examples 5-7, the crystallinity of $Li_2FeP_2O_7$ is 5%, and the crystallinity of $LiFePO_4$ is 8%.

From the combination of examples 1-1 to 1-33 and comparative examples 1-4, it can be seen that the existence of the first coating layer is conducive to reduce the Li/Mn antisite defect concentration of the obtained material and the dissolution of Fe and Mn after cycling, increase the gram capacity of button battery of the battery, and improve the safety performance and cycling performance of the battery. When other elements are doped on the Mn site and phosphorus site respectively, the lattice change rate, antisite defect concentration and Fe and Mn dissolution of the obtained material can be significantly reduced, the gram capacity of the battery can be increased, and the safety performance and cycling performance of the battery can be improved.

From the combination of examples 1-1 to 1-6, it can be seen that with the increase of the amount of the first coating layer from 3.2% to 6.4%, the Li/Mn anti site defect concentration of the obtained material gradually decreases, and the Fe and Mn dissolution gradually decreases after cycling, and the safety performance and cycling performance at 45° C. of the corresponding battery are also improved, but the gram capacity of the button battery decreases slightly. Optionally, when the total amount of the first coating layer is 4-5.6 wt %, the overall performance of the corresponding battery is the best.

From the combination of example 1-3 and examples 1-7 to 1-10, it can be seen that with the increase of the amount of the second coating layer from 1% to 6%, the Li/Mn anti site defect concentration of the obtained material gradually decreases, and the Fe and Mn dissolution gradually decreases after cycling, and the safety performance and cycling performance at 45° C. of the corresponding battery are also improved, but the gram capacity of the button battery decreases slightly. Optionally, when the total amount of the second coating layer is 3-5 wt %, the overall performance of the corresponding battery is the best.

From the combination of examples 1-11 to 1-15 and comparative examples 5-6, it can be seen that when $Li_2FeP_2O_7$ and $LiFePO_4$ exist simultaneously in the first coating layer, and especially the weight ratio of $Li_2FeP_2O_7$ to $LiFePO_4$ is 1:3 to 3:1, and especially 1:3 to 1:1, the improvement of battery performance is more obvious.

TABLE 2

Performance test results of examples 2-1 to 2-4

| Example No. | First coating layer | Crystallinity of pyrophosphate and phosphate | Lattice change rate (%) | Li/Mn antisite defect concentration/% | Dissolution of Fe and Mn after cycling (ppm) | Surface oxygen valence state | Capacity of button battery at 0.1 C. (mAh/g) | Average discharge voltage of button battery (V) | Expansion of cell when stored at 60° C. for 30 d (%) | Capacity retention rate during cycling at 45° C. |
|---|---|---|---|---|---|---|---|---|---|---|
| Example 2-1 | 1% $Li_2FeP_2O_7$/ 3% $LiFePO_4$ | 30% | 6.3 | 1.9 | 147 | −1.88 | 145.2 | 3.72 | 5.6 | 698 |
| Example 2-2 | 1% $Li_2FeP_2O_7$/ 3% $LiFePO_4$ | 50% | 4.7 | 1.2 | 97 | −1.89 | 149.2 | 3.74 | 4.7 | 869 |
| Example 2-3 | 1% $Li_2FeP_2O_7$/ 3% $LiFePO_4$ | 70% | 3.5 | 0.8 | 29 | −1.91 | 151.3 | 3.75 | 3.8 | 1027 |
| Example 2-4 | 1% $Li_2FeP_2O_7$/ 3% $LiFePO_4$ | 100% | 2.4 | 0.4 | 8 | −1.98 | 158.2 | 3.79 | 1.9 | 1328 |

[1]refers to the crystallinity of $Li_2FeP_2O_7$ and $LiFePO_4$ are 30%, 50%, 70%, and 100%, respectively.

It can be seen from Table 2 that as the crystallinity of pyrophosphate and phosphate in the first coating layer gradually increases, the lattice change rate of the corresponding material, the Li/Mn antisite defect concentration, and the dissolution of Fe and Mn gradually decrease, the button battery capacity of the battery is gradually increased, and the safety performance and cycling performance are also gradually improved.

TABLE 3

Performance test results of Examples 3-1 to 3-12

| Example No. | Doping element type and doping amount | Temperature in reaction kettle(° C.) | Stirring time/ min | Lattice change rate (%) | Li/Mn antisite defect concentration/ % | Dissolution of Fe and Mn after cycling (ppm) | Surface oxygen valence state | Capacity of button battery at 0.1 C. (mAh/g) | Average discharge voltage of button battery (V) | Expansion of cell when stored at 60° C. for 30 d (%) | Number of cycles for capacity retention rate of 80% at 45° C. |
|---|---|---|---|---|---|---|---|---|---|---|---|
| Example 3-1 | $Li_{0.999}Mn_{0.60}Fe_{0.393}V_{0.004}Co_{0.003}P_{0.999}S_{0.001}O_4$ | 60 | 120 | 5.6 | 2.4 | 49 | −1.98 | 155.2 | 3.67 | 5.6 | 1102 |

TABLE 3-continued

| Performance test results of Examples 3-1 to 3-12 | | | | | | | | | | | |
|---|---|---|---|---|---|---|---|---|---|---|---|
| Example No. | Doping element type and doping amount | Temperature in reaction kettle(° C.) | Stirring time/min | Lattice change rate (%) | Li/Mn antisite defect concentration/% | Dissolution of Fe and Mn after cycling (ppm) | Surface oxygen valence state | Capacity of button battery at 0.1 C. (mAh/g) | Average discharge voltage of button battery (V) | Expansion of cell when stored at 60° C. for 30 d (%) | Number of cycles for capacity retention rate of 80% at 45° C. |
| Example 3-2 | $Li_{0.999}Mn_{0.60}Fe_{0.393}V_{0.004}Co_{0.003}P_{0.999}S_{0.001}O_4$ | 70 | 120 | 4.8 | 1.9 | 37 | −1.98 | 155.7 | 3.69 | 4.7 | 1203 |
| Example 3-3 | $Li_{0.999}Mn_{0.60}Fe_{0.393}V_{0.004}Co_{0.003}P_{0.999}S_{0.001}O_4$ | 80 | 120 | 3.7 | 1.3 | 28 | −1.98 | 156.4 | 3.72 | 3.8 | 1275 |
| Example 3-4 | $Li_{0.999}Mn_{0.60}Fe_{0.393}V_{0.004}Co_{0.003}P_{0.999}S_{0.001}O_4$ | 90 | 120 | 2.9 | 1.1 | 17 | −1.98 | 157.8 | 3.75 | 3.1 | 1305 |
| Example 3-5 | $Li_{0.999}Mn_{0.60}Fe_{0.393}V_{0.004}Co_{0.003}P_{0.999}S_{0.001}O_4$ | 100 | 120 | 2.5 | 0.5 | 9 | −1.98 | 158.5 | 3.78 | 2.4 | 1327 |
| Example 3-6 | $Li_{0.999}Mn_{0.60}Fe_{0.393}V_{0.004}Co_{0.003}P_{0.999}S_{0.001}O_4$ | 110 | 120 | 2.8 | 1.2 | 19 | −1.98 | 156.7 | 3.73 | 3.6 | 1257 |
| Example 3-7 | $Li_{0.999}Mn_{0.60}Fe_{0.393}V_{0.004}Co_{0.003}P_{0.999}S_{0.001}O_4$ | 120 | 120 | 3.7 | 2.1 | 38 | −1.98 | 154.8 | 3.69 | 4.8 | 1179 |
| Example 3-8 | $Li_{0.999}Mn_{0.60}Fe_{0.393}V_{0.004}Co_{0.003}P_{0.999}S_{0.001}O_4$ | 130 | 120 | 4.5 | 3.4 | 46 | −1.98 | 153.7 | 3.64 | 6.3 | 986 |
| Example 3-9 | $Li_{0.999}Mn_{0.60}Fe_{0.393}V_{0.004}Co_{0.003}P_{0.999}S_{0.001}O_4$ | 100 | 60 | 4.9 | 3.1 | 38 | −1.98 | 155.4 | 3.76 | 4.9 | 1021 |
| Example 3-10 | $Li_{0.999}Mn_{0.60}Fe_{0.393}V_{0.004}Co_{0.003}P_{0.999}S_{0.001}O_4$ | 100 | 90 | 4.1 | 2.5 | 27 | −1.98 | 156.3 | 3.77 | 4.2 | 1097 |
| Example 3-11 | $Li_{0.999}Mn_{0.60}Fe_{0.393}V_{0.004}Co_{0.003}P_{0.999}S_{0.001}O_4$ | 100 | 150 | 3.5 | 1.1 | 15 | −1.98 | 157.8 | 3.79 | 3.1 | 1184 |
| Example 3-12 | $Li_{0.999}Mn_{0.60}Fe_{0.393}V_{0.004}Co_{0.003}P_{0.999}S_{0.001}O_4$ | 100 | 180 | 2.5 | 0.5 | 11 | −1.98 | 158.1 | 3.79 | 2.4 | 1297 |

Note
1. The temperature and stirring time in the reaction kettle are the parameters during the preparation of element A doped manganese oxalate (i.e, step (1)).

It can be seen from Table 3 that by adjusting the reaction temperature and reaction time in the reaction kettle during the preparation of manganese oxalate particles, various performances of the positive electrode material of the present application can be further improved. For example, when the reaction temperature gradually increases from 60° C. to 130° C., the lattice change rate and Li/Mn antisite defect concentration first decreases and then increases, and the corresponding metal dissolution and safety performance after cycling also show similar rules, while the button battery capacity and cycling performance first increase and then decrease with the increase of temperature. Keeping the reaction temperature constant and adjusting the reaction time can also show a similar rule.

TABLE 4a

Performance test results of examples 4-1 to 4-7 and comparative examples 8-11

| Example No. | $Li_2FeP_2O_7$:$LiFePO_4$ (weight ratio) | Drying temperature (° C.) | Drying time (h) | Sintering temperature (° C.) | Sintering time (h) |
|---|---|---|---|---|---|
| Example 4-1 | 1:3 | 100 | 4 | 700 | 6 |
| Example 4-2 | 1:3 | 150 | 6 | 700 | 6 |
| Example 4-3 | 1:3 | 200 | 6 | 700 | 6 |
| Example 4-4 | 1:3 | 200 | 6 | 600 | 6 |
| Example 4-5 | 1:1 | 150 | 6 | 600 | 4 |
| Example 4-6 | 1:1 | 150 | 6 | 600 | 6 |
| Example 4-7 | 1:1 | 150 | 6 | 800 | 8 |
| Comparative example 8 | 1:3 | 80 | 3 | 400 | 3 |
| Comparative example 9 | 1:1 | 80 | 3 | 400 | 3 |
| Comparative example 10 | Only $Li_2FeP_2O_7$ | 80 | 3 | 350 | 2 |
| Comparative example 11 | Only $LiFePO_4$ | 80 | 3 | — | — |

TABLE 4b

Performance test results of examples 4-1 to 4-7 and comparative examples 8-11

| Example No. | Lattice spacing of pyrophosphate in the first coating layer (nm) | Angle of the pyrophosphate of the first coating layer (°) | Lattice spacing of phosphate in the first coating layer (nm) | Angle of the phosphate of the first coating layer (°) | Lattice change rate (%) | Li/Mn antisite defect concentration/% | Surface oxygen valence state | Capacity of button battery at 0.1 C. (mAh/g) | Average discharge voltage of button battery (V) | Expansion of cell when stored at 60° C. for 30 d (%) | Number of cycles for capacity retention rate of 80% at 45° C. |
|---|---|---|---|---|---|---|---|---|---|---|---|
| Example 4-1 | 0.303 | 29.496 | 0.348 | 25.562 | 2.9 | 0.6 | −1.97 | 155.4 | 3.71 | 3.4 | 1183 |
| Example 4-2 | 0.303 | 29.496 | 0.348 | 25.562 | 2.6 | 0.6 | −1.98 | 157.8 | 3.78 | 2.4 | 1347 |
| Example 4-3 | 0.303 | 29.496 | 0.348 | 25.562 | 2.7 | 0.6 | −1.98 | 156.5 | 3.73 | 3.1 | 1277 |
| Example 4-4 | 0.303 | 29.496 | 0.348 | 25.562 | 2.9 | 1.1 | −1.95 | 153.8 | 3.69 | 3.9 | 984 |
| Example 4-5 | 0.303 | 29.496 | 0.348 | 25.562 | 2.8 | 1.2 | −1.94 | 155.5 | 3.71 | 3.5 | 895 |
| Example 4-6 | 0.303 | 29.496 | 0.348 | 25.562 | 2.6 | 0.8 | −1.95 | 156.3 | 3.72 | 3.1 | 963 |
| Example 4-7 | 0.303 | 29.496 | 0.348 | 25.562 | 2.5 | 0.4 | −1.97 | 156.9 | 3.74 | 2.7 | 1043 |
| Comparative example 8 | — | — | — | — | 3.9 | 1.8 | −1.91 | 148.0 | 3.67 | 9.4 | 779 |
| Comparative example 9 | — | — | — | — | 3.6 | 1.6 | −1.93 | 149.4 | 3.70 | 6.8 | 683 |
| Comparative example 10 | — | — | — | — | 3.7 | 1.7 | −1.86 | 147.5 | 3.68 | 11.5 | 385 |
| Comparative example 11 | — | — | — | — | 3.4 | 1.4 | −1.93 | 150.3 | 3.72 | 4.7 | 526 |

It can be seen from Tables 4a and 4b that when preparing lithium iron pyrophosphate by the method of the present application, by adjusting the drying temperature/time and sintering temperature/time during the preparation process, the performance of the obtained material can be improved, thereby improving the battery performance. From comparative examples 8-11, it can be seen that when the drying temperature in the preparation process of lithium iron pyrophosphate is lower than 100° C. or the temperature in the sintering step is lower than 400° C., $Li_2FeP_2O_7$, which is expected to be prepared in the present application, will not be obtained, thereby failing to improve the material properties as well as the performance of the battery comprising the resulting material.

Specific Examples of New Conductive Undercoat Layer

Hereinafter, the examples of the present application will be explained. The examples described below are exemplary and are merely for explaining the present application, and should not be construed as limiting the present application. The examples in which techniques or conditions are not specified are based on the techniques or conditions described in documents in the art or according to the product introduction. The reagents or instruments used therein for which manufacturers are not specified are all conventional products that are commercially available.

For the distinguishment from the new positive electrode material in the above specific examples, the specific examples of the new conductive undercoat layer are marked with a suffix ['] after the number.

Example 1-1' (with a Positive Electrode Active Material of Example 1-1)

1. Providing First Polymer

In the following examples, the first polymer is a hydrogenated carboxylated nitrile rubber, which comprises a first monomer unit, a second monomer unit, a third monomer unit and a fourth monomer unit. The weight percentages of the first monomer unit, the second monomer unit, the third monomer unit and the fourth monomer unit in the polymer, and the weight-average molecular weight of the first polymer are shown in Table 1P.

TABLE 1P

| First monomer unit weight percentage M1 | Second monomer unit weight percentage M2 | Third monomer unit weight percentage M3 | Fourth monomer unit weight percentage M4 | Weight-average molecular weight/ 10,000 |
|---|---|---|---|---|
| 34% | 64% | 1% | 1% | 25 |

The first monomer unit is a monomer unit represented by formula 1;

formula 1

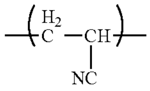

the second monomer unit is selected from at least one of a group consisting of a monomer unit represented by formula 2 and a monomer unit represented by formula 3;

formula 2

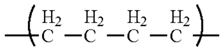

-continued formula 3

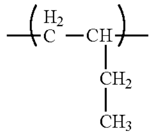

the third monomer unit is selected from at least one of a group consisting of a monomer unit represented by formula 4 and a monomer unit represented by formula 5;

formula 4

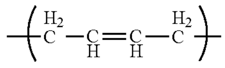

formula 5

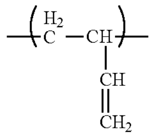

the fourth monomer unit is a monomer unit represented by formula 6:

formula 6

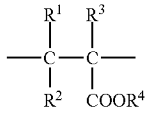

In this example, $R^1$, $R^2$ and $R^3$ are all H, and $R^4$ is n-butyl.

2. Preparation of Aluminum Foil with Conductive Undercoat Layer

The first polymer, the first water-based binder (a polyacrylic acid-acrylate copolymer, a weight-average molecular weight of 340,000) and the first conductive agent (SP) are dissolved/dispersed at a weight ratio of 15:40:45 into an NMP solvent and formulated as a conductive undercoat layer slurry.

The conductive undercoat layer slurry is coated on both sides of the aluminum foil, and after drying, a conductive undercoat layer with a thickness of 5 μm is formed on each side. An aluminum foil with a conductive undercoat layer is obtained.

3) Preparation of Positive Electrode Plate

The double-coated lithium manganese phosphate positive electrode active material prepared in the above example 1-1, a conductive agent acetylene black and a binder polyvinylidene fluoride (PVDF) are mixed uniformly in an N-methylpyrrolidone solvent system at a weight ratio of 92:2.5:5.5, to obtain the positive electrode slurry, the positive electrode slurry is coated on both sides of the aluminum foil with a conductive undercoat layer, followed by drying and cold pressing, to form a positive electrode film layer, and obtain a positive electrode plate. The positive electrode film layer has a single-side surface density of 0.025 g/$cm^2$ and a compacted density of 2.4 g/$cm^3$.

4) Preparation of Negative Electrode Plate

Negative electrode active materials artificial graphite and hard carbon, a conductive agent acetylene black, a binder styrene butadiene rubber (SBR) and a thickening agent sodium carboxymethylcellulose (CMC) are uniformly mixed in deionized water in a weight ratio of 90:5:2:2:1, and the mixture is applied to a copper foil, followed by drying and cold pressing, so as to form a negative electrode film layer, to obtain a negative electrode plate. The negative electrode film layer has a single-side surface density of 0.013 g/$cm^2$ and a compacted density of 1.7 g/$cm^3$.

5) Packaging of Full Battery

With a polyethylene (PE) porous polymer film as a separator, the positive electrode plate, the separator and the negative electrode plate are stacked in sequence, such that the separator is located between the positive electrode and the negative electrode to play a role of isolation, and then winding is performed to obtain a bare cell. The bare cell is placed in an outer package, injected with the electrolyte solution and packaged to obtain a full battery.

The weight of the positive electrode active material in a single full battery is 565.66 g. The weight of the negative electrode active material is 309.38 g.

Examples 1-2' to 1-33' (with Positive Electrode Active Materials of Examples 1-2 to 1-33)

Examples 1-2' to 1-33' are different from example 1-1' by step 3). Other step parameters are the same as those in example 1-1'.

The positive electrode active materials used in step 3) in examples 1-2' to 1-33' are the positive electrode active materials in the above examples 1-2 to 1-33 respectively.

Examples 2-1' to 2-3' (with Positive Electrode Active Materials of Examples 2-1 to 2-3)

Examples 2-1' to 2-3' are different from example 1-1' by step 3). Other step parameters are the same as those in example 1-1'.

The positive electrode active materials used in step 3) in examples 2-1' to 2-3' are the positive electrode active materials in the above examples 2-1 to 2-3 respectively.

Comparative Examples 1' to 8' (Without Conductive Undercoat Layer)

Comparative examples 1' to 8' are different from example 1-1' by steps 2) and 3). Other step parameters are the same as those in example 1-1'.

In comparative examples 1' to 8', in steps 2) and 3), no aluminum foil with a conductive undercoat layer is prepared, and the positive electrode slurry is directly coated onto the aluminum foil, followed by drying, and cold pressing to form the positive electrode film layer, to obtain the positive electrode plate.

The positive electrode active materials used in step 3) of comparative examples 1' to 7' are the positive electrode active materials of the above comparative examples 1-1 to 1-7, respectively.

The positive electrode active material used in step 3) of comparative example 8' is the positive electrode active materials of the above example 1-1.

Comparative Example 9' (without First Polymer)

Comparative example 9' is different from example 1-1' by step 2). Other step parameters are the same as those in example 1-1'.

In step 2) of comparative example 9', the first water-based binder (a polyacrylic acid-acrylate copolymer) and the first conductive agent (SP), at a weight ratio of 40:45, are dissolved/dispersed in deionized water, and formulated as a conductive undercoat layer slurry. The conductive undercoat layer slurry is coated onto an aluminum foil, and dried to form a conductive undercoat layer with a thickness of 5 μm. An aluminum foil with a conductive undercoat layer is obtained.

Comparative Example 10' (Replacing the First Polymer With Polymer I)

Comparative Example 10' is different from example 1-1' by step 2). Other step parameters are the same as those in example 1-1'.

In step 2) of comparative example 10', the polymer I, the first water-based binder (a polyacrylic acid-acrylate copolymer) and the first conductive agent (SP), at a weight ratio of 15:40:45, are dissolved/dispersed in deionized water, and formulated as a conductive undercoat layer slurry. The conductive undercoat layer slurry is coated onto an aluminum foil, and dried to form a conductive undercoat layer with a thickness of 5 μm. An aluminum foil with a conductive undercoat layer is obtained.

The difference between the polymer I and the first polymer is that the compositions of the polymer are different, and the composition and weight-average molecular weight of the polymer I are shown in Table 2P below.

TABLE 2P

| First monomer unit weight percentage M1 | Second monomer unit weight percentage M2 | Third monomer unit weight percentage M3 | Fourth monomer unit weight percentage M4 | Weight-average molecular weight/ 10,000 |
|---|---|---|---|---|
| 30% | 59% | 10% | 1% | 25 |

Comparative Example 11' (Replacing the First Water-Based Binder with I Binder)

Comparative Example 11' is different from example 1-1' by step 2). Other step parameters are the same as those in example 1-1'.

In step 2) of comparative example 11', the first polymer, the I binder (polyacrylic acid, a weight-average molecular weight of 350,000) and the first conductive agent (SP), at a weight ratio of 15:40:45, are dissolved/dispersed in deionized water, and formulated as a conductive undercoat layer slurry. The conductive undercoat layer slurry is coated onto an aluminum foil, and dried to form a conductive undercoat layer with a thickness of 5 μm. An aluminum foil with a conductive undercoat layer is obtained.

Analysis and Test

Figure 2:
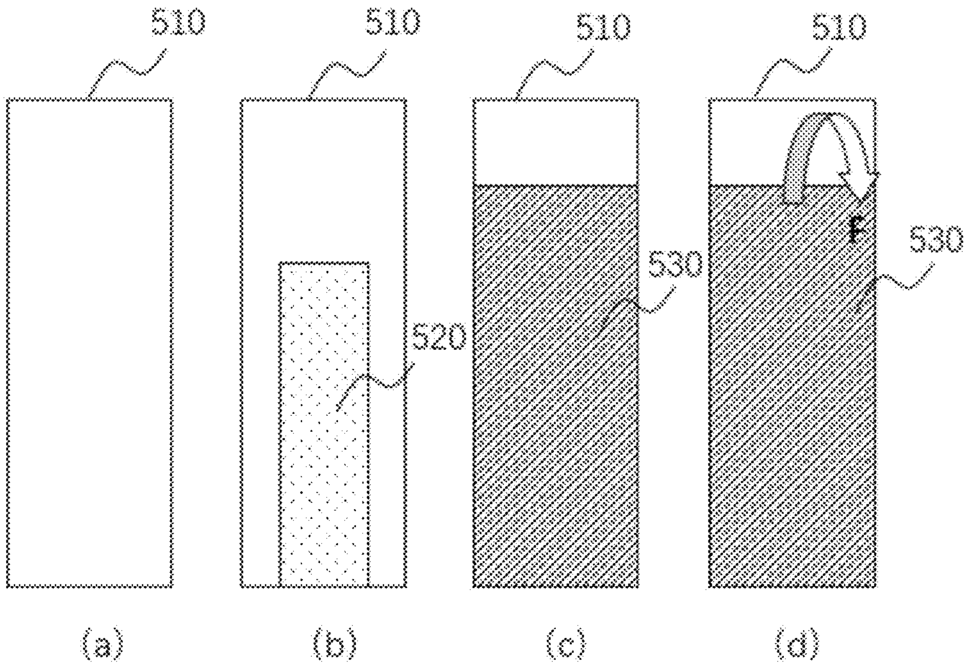
FIG. 2 is a schematic flow diagram of the measurement of the bonding force of an electrode plate in one embodiment of the present application.

1. Testing for Adhesive Force of Positive Electrode Plate (a)-(d) of FIG. 2 show the flowchart of a peeling test. As shown in FIG. 2(*a*), first, a steel plate 510 is provided, with the size of the steel plate being 30 mm width×100 mm length. As shown in FIG. 2(*b*), then, a double-sided adhesive tape 520 with a size of 20 mm width×30 mm length is provided, and the double-sided adhesive tape 520 is adhered onto the steel plate 510, with a width side of the double-sided adhesive tape 520 being aligned with a width side of the steel plate 510. As shown in FIG. 2(*c*), then, an electrode plate to be tested 530 is provided, with the size of the electrode plate to be tested 530 being mm width×180 mm length. The electrode plate to be tested 530 is covered on the double-sided adhesive tape 520 (with the two sides being aligned), with the coating surface of the electrode plate 530 facing the double-sided adhesive tape 520. Since the length of the electrode plate to be tested 530 is longer than that of the double-sided adhesive tape 520, some areas of the electrode plate to be tested 530 are not bonded to the double-sided adhesive tape. As shown in FIG. 2(*d*), the steel plate 510 is fixed on the base of a tensile testing machine, the end that is not bonded with the double-sided adhesive tape of the electrode plate to be tested 530 is clamped by a clamp, and then the clamp is stretched towards the direction of the other end (as shown by the arrow), with the direction of the stretching force being perpendicular to the steel plate 510 and with a distance to the surface of the steel plate 510. While stretching and peeling off the electrode plate to the outside of the paper, the steel plate moves upwards to keep the stretching direction perpendicular to the peeling position of the electrode plate. The electrode plate 530 is gradually peeled away from the steel plate during stretching. The stretching speed of the clamp is 50 mm/min during the stretching. In the process of stretching, the tension force of the clamp is recorded, the peeling in 40 mm length is not started until the tension force is stable, and the average tension force over this peeling length is considered as the adhesive force (unit N).

2. Direct-Current Resistance Test

At 25° C., the battery is charged to 4.3 V at a 1.0 C constant current and constant voltage (1.0 C refers to the nominal capacity); the battery power is adjusted to 50% SOC at 1.0 C rate, left to stand for 5 min, then discharge at a 4 C constant current ($I_m$) for 30 s (with the voltage data collected every 1 s), and the initial voltage $U_0$ and the voltage $U_{30}$ after 30 s of discharge are recorded. The direct current resistance (DCR) value is calculated by the following formula.

$$\text{direct-current resistance value}=(U_0-U_{30})/I_m$$

Taking the direct-current resistance value of the battery of example 1-1' as 100%, the changes of other examples and comparative examples relative to example 1-1' are expressed in percentage form.

3. Number of Cycles of Battery for Capacity Retention Rate of 80% at 45° C. (Hereinafter Referred to as "Cycle Number for 80% Capacity")

In a constant-temperature environment at 45° C., at 2.5 to 4.3 V, a full battery is charged at 1C to 4.3 V, and then charged at a constant voltage of 4.3 V until the current is less than or equal to 0.05 mA. The full battery is allowed to stand for 5 min, and then discharged at 1C to 2.5 V, and the discharge capacity at this moment is recorded as D0. The above-mentioned charge/discharge cycle is repeated until the discharge capacity is reduced to 80% of D0. The number of cycles experienced by the battery at this moment is recorded.

According to the above-mentioned testing and analysis methods, the adhesive force, the direct-current resistance value of the battery and the number of cycles for capacity retention rate of 80% at 45° C. from the positive electrode plates prepared in the above examples 1-1' to 1-33', examples 2-1' to 2-3' and comparative examples 1' to 11' are tested, and the results are shown in Table 3P below.

TABLE 3P

| | Adhesive force of positive electrode plate/N | direct-current resistance example 1-1'-based | Number of cycles for 80% capacity |
|---|---|---|---|
| Example 1-1' | 13 | 100% | 1650 |
| Example 1-2' | 15.2 | 110% | 800 |
| Example 1-3' | 15.0 | 110% | 910 |
| Example 1-4' | 14.3 | 110% | 982 |
| Example 1-5' | 14.7 | 107% | 1103 |
| Example 1-6' | 14.1 | 106% | 1200 |
| Example 1-7' | 8.2 | 111% | 1000 |
| Example 1-8' | 6.8 | 109% | 1107 |
| Example 1-9' | 5.0 | 110% | 1201 |
| Example 1-10' | 4.0 | 101% | 1302 |
| Example 1-11' | 7.7 | 108% | 1007 |
| Example 1-12' | 8.2 | 108% | 963 |
| Example 1-13' | 7.3 | 112% | 907 |
| Example 1-14' | 8 | 116% | 800 |
| Example 1-15' | 8 | 117% | 842 |
| Example 1-16' | 7.3 | 110% | 1047 |
| Example 1-17' | 7 | 104% | 1300 |
| Example 1-18' | 7 | 104% | 1308 |
| Example 1-19' | 7 | 100% | 1484 |
| Example 1-20' | 8 | 100% | 1462 |
| Example 1-21' | 9 | 95% | 1577 |
| Example 1-22' | 8.1 | 99% | 1352 |
| Example 1-23' | 7.8 | 98% | 1369 |
| Example 1-24' | 8 | 95% | 1466 |
| Example 1-25' | 8 | 94% | 1495 |
| Example 1-26' | 7.5 | 104% | 1244 |
| Example 1-27' | 7.9 | 105% | 1500 |
| Example 1-28' | 9 | 110% | 1022 |
| Example 1-29' | 7.3 | 110 | 1155 |
| Example 1-30' | 7 | 111% | 1083 |
| Example 1-31' | 8.5 | 111% | 1044 |
| Example 1-32' | 7.9 | 120% | 1002 |
| Example 1-33' | 7.7 | 120% | 957 |
| Example 2-1' | 10.1 | 155% | 598 |
| Example 2-2' | 10.5 | 157% | 769 |
| Example 2-3' | 10.5 | 132% | 1127 |
| Comparative example 1' | 4 | 231% | 105 |
| Comparative example 2' | 4.1 | 208% | 367 |
| Comparative example 3' | 4.3 | 200% | 300 |
| Comparative example 4' | 4 | 200% | 500 |
| Comparative example 5' | 3.7 | 180% | 625 |
| Comparative example 6' | 3.9 | 176% | 590 |
| Comparative example 7' | 4.6 | 155% | 740 |
| Comparative example 8' | 5.5 | 118% | 1406 |
| Comparative example 9' | 7.3 | 116% | 1584 |
| Comparative example 10' | 14.2 | 280% | 630 |
| Comparative example 11' | 10.4 | 103% | 1500 |

It can be seen from Table 3P that the positive electrode plates of examples 1-1' to 1-33' and examples 2-1' to 2-3' show improved adhesive forces, and the batteries of examples 1-1' to 1-33', examples 2-1' to 2-3' show reduced direct-current resistance and increased cycle capacity retention rate.

Comparative example 8' (without a conductive undercoat layer), comparative example 9' (without a first polymer), comparative example 10' (replacing the first polymer with an polymer I), comparative example 11' (replacing the first water-based binder with an I binder) fail to achieve the effect of the above-mentioned improvement.

Examples 3-1' to 3-7' (with Changes in Composition of the First Polymer)

Examples 3-1' to 3-7' are different from example 1-1' by step 2). Other step parameters are the same as those in example 1-1'.

In step 2), the compositions of the first polymer used in examples 3-1' to 3-7' are different from those in example 1-1', and specifically the weight percentages of the second monomer unit and the third monomer unit are different from those in example 1-1'. The compositions of the first polymers of examples 3-1' to 3-7' are shown in Table 4P below.

TABLE 4P

| | First monomer unit weight percentage M1 | Second monomer unit weight percentage M2 | Third monomer unit weight percentage M3 | Fourth monomer unit weight percentage M4 | M3/ (M2 + M3) |
|---|---|---|---|---|---|
| Example 1-1' | 0.64 | 0.01 | 0.01 | 0.015 | 0.34 |
| Example 3-1' | 0.65 | 0 | 0.01 | 0 | 0.34 |
| Example 3-2' | 0.649675 | 0.000325 | 0.01 | 0.0005 | 0.34 |
| Example 3-3' | 0.64935 | 0.00065 | 0.01 | 0.001 | 0.34 |
| Example 3-4' | 0.6487 | 0.0013 | 0.01 | 0.002 | 0.34 |
| Example 3-5' | 0.64805 | 0.00195 | 0.01 | 0.003 | 0.34 |
| Example 3-6' | 0.64675 | 0.00325 | 0.01 | 0.005 | 0.34 |
| Example 3-7' | 0.598 | 0.052 | 0.01 | 0.08 | 0.34 |

Examples 3-8' to 3-12' (with Changes in Conductive Undercoat Layer Thickness)

Examples 3-8' to 3-12' are different from example 1-1' by step 2). Other step parameters are the same as those in example 1-1'.

In step 2), the thickness of the conductive undercoat layer in examples 3-8' to 3-12' is different from that in example 1-1', see Table 5P for details.

TABLE 5P

| | Example 1-1' | Example 3-8' | Example 3-9' | Example 3-10' | Example 3-11' | Example 3-12' |
|---|---|---|---|---|---|---|
| Conductive undercoat layer thickness | 5 μm | 1 μm | 3 μm | 7 μm | 10 μm | 20 μm |

Examples 3-13' to 3-18' (with Changes in Composition of the Conductive Undercoat Layer)

Examples 3-13' to 3-18' are different from example 1-1' by step 2). Other step parameters are the same as those in example 1-1'.

In step 2), the compositions of the conductive undercoat layer (the ratio of the first polymer, the first water-based binder to the first conductive agent) of examples 3-13' to 3-18' are different from those in example 1-1', see Table 6P for details.

TABLE 6P

| | First polymer weight part | First water-based binder weight part | First conductive agent weight part |
|---|---|---|---|
| Example 1-1' | 15 | 40 | 45 |
| Example 3-13' | 5 | 45 | 50 |
| Example 3-14' | 10 | 40 | 50 |
| Example 3-15' | 20 | 30 | 50 |
| Example 3-16' | 10 | 80 | 10 |
| Example 3-17' | 10 | 65 | 25 |
| Example 3-18' | 10 | 50 | 40 |

According to the above-mentioned testing and analysis methods, the adhesive force, the direct-current resistance value of the battery and the number of cycles for capacity retention rate of 80% at 45° C. of the positive electrode plates prepared in the above example 1-1' and examples 3-1' to 3-18' are tested, and the results are shown in Table 7P below.

TABLE 7P

| | Adhesive force of electrode plate | direct-current resistance | Number of cycles for 80% capacity |
|---|---|---|---|
| Example 1-1' | 13 | 100% | 1650 |
| Example 3-1' | 12.7 | 100% | 1700 |
| Example 3-2' | 13 | 97% | 1688 |
| Example 3-3' | 12.5 | 100% | 1703 |
| Example 3-4' | 13.1 | 99% | 1600 |
| Example 3-5' | 13.8 | 98% | 1660 |
| Example 3-6' | 13.9 | 99% | 1655 |
| Example 3-7' | 12 | 258% | 731 |
| Example 3-8' | 8.5 | 110% | 1540 |
| Example 3-9' | 7.3 | 101% | 1720 |
| Example 3-10' | 9.9 | 100% | 1779 |
| Example 3-11' | 21.1 | 120% | 1600 |
| Example 3-12' | 32.5 | 150% | 1678 |
| Example 3-13' | 8.1 | 100% | 1630 |
| Example 3-14' | 10.5 | 105% | 1680 |
| Example 3-15' | 11.6 | 103% | 1701 |
| Example 3-16' | 10.7 | 145% | 1600 |
| Example 3-17' | 14.5 | 130% | 1635 |
| Example 3-18' | 15 | 110% | 1630 |

It can be seen from Table 7P that the positive electrode plates of examples 1-1', and 3-1' to 3-18' show improved adhesive forces, and the batteries of examples 1-1' and 3-1' to 3-18' show reduced direct-current resistance and increased cycle capacity retention rate. When the value of M3/(M2+M3) is 0-5%, the direct current resistance of the battery shows a significant decrease.

Examples 4-1' to 4-9'

Examples 4-1' to 4-9' are different from example 1-1' by step 3). Other step parameters are the same as those in example 1-1'.

In step 3) in examples 4-1' to 4-9', the double-coated lithium manganese phosphate positive electrode active material prepared in the above example 1-1, a conductive agent acetylene black, a binder polyvinylidene fluoride (PVDF), a dispersant and an infiltration agent are mixed uniformly in an N-methylpyrrolidone solvent system at a weight ratio of (92-$Y_1$-$Y_2$):2.5:5.5:$Y_1$:$Y_2$, to obtain the positive electrode slurry, the positive electrode slurry is coated on both sides of the aluminum foil with a conductive undercoat layer, followed by drying and cold pressing, to form a positive electrode film layer, and a positive electrode plate is obtained. The positive electrode film layer has a single-side surface density of 0.025 g/$cm^2$ and a compacted density of 2.4 g/$cm^3$.

The infiltration agent in examples 4-1' to 4-9' is a maleic anhydride-styrene copolymer (molecular weight: 5000). The dispersant in examples 4-1' to 4-9' is the second polymer.

The second polymer is a hydrogenated nitrile rubber comprising a fifth monomer unit, a sixth monomer unit and a seventh monomer unit. The weight percentages of the five monomer unit, the sixth monomer unit and the seventh monomer unit in the polymer, and the weight-average molecular weight of the second polymer are shown in Table 8P.

The fifth monomer unit is a monomer unit represented by formula 1;

formula 7

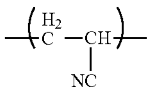

the sixth monomer unit is selected from at least one of a group consisting of a monomer unit represented by formula 8 and a monomer unit represented by formula 9;

formula 8

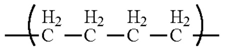

formula 9

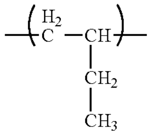

the seventh monomer unit is selected from at least one of a group consisting of a monomer unit represented by formula 10 and a monomer unit represented by formula 11;

formula 10

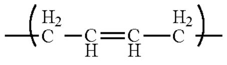

-continued formula 11

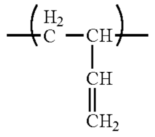

TABLE 8P

| Fifth monomer unit weight percentage M5 | Sixth monomer unit weight percentage M6 | Seventh monomer unit weight percentage M7 | Weight-average molecular weight/10,000 |
|---|---|---|---|
| 45% | 54.9% | 0.1% | 22 |

In the positive electrode plates of examples 4-1' to 4-9', the mass ratio of the first polymer (from the conductive undercoat layer) to the second polymer (from the positive electrode film layer) is 2:1.

In step 3) in examples 4-1' to 4-9', the proportions of the dispersant (second polymer) $Y_1$ and the proportions of the infiltration agent (a maleic anhydride-styrene copolymer) $Y_2$ and the ratio thereof $Y_1/Y_2$ are shown in Table 9P below.

TABLE 9P

| | $Y_1$ | $Y_2$ | $Y_1/Y_2$ |
|---|---|---|---|
| Example 4-1' | 0.2 | 0.3 | 0.67 |
| Example 4-2' | 0.1 | 0.5 | 0.20 |
| Example 4-3' | 0.5 | 0.5 | 1.00 |
| Example 4-4' | 1 | 0.5 | 2.00 |
| Example 4-5' | 0.25 | 0.05 | 5.00 |
| Example 4-6' | 0.25 | 0.2 | 1.25 |
| Example 4-7' | 0.25 | 0.3 | 0.83 |
| Example 4-8' | 0.25 | 0.8 | 0.31 |
| Example 4-9' | 0.25 | 2 | 0.13 |

According to the above-mentioned testing and analysis methods, the adhesive force, the direct-current resistance value of the battery and the number of cycles for capacity retention rate of 80% at 45° C. of the positive electrode plates prepared in the above example 1-1' and examples 4-1' to 4-9' are tested, and the results are shown in Table 10P below.

TABLE 10P

| | Adhesive force of electrode plate | Direct-current resistance | Number of cycles |
|---|---|---|---|
| Example 1-1' | 13 | 100% | 1650 |
| Example 4-1' | 64 | 93% | 1762 |
| Example 4-2' | 60 | 95% | 1770 |
| Example 4-3' | 178 | 104% | 1310 |
| Example 4-4' | 193 | 160% | 1308 |
| Example 4-5' | 105 | 100% | 1700 |
| Example 4-6' | 105 | 99% | 1830 |
| Example 4-7' | 110 | 98% | 1781 |
| Example 4-8' | 108 | 106% | 1690 |
| Example 4-9' | 109 | 116% | 1410 |

As shown in Table 10P, on the basis of the above new conductive undercoat layer, combined with a new positive electrode film layer containing a dispersant and an infiltration agent, the adhesive force of the electrode plate can be further improved, and/or the direct-current resistance of the battery can be reduced, and/or the cycling performance of the battery is improved.

In view of the above experiment data, the present application provides a new positive electrode plate, a secondary battery and a power consuming device. The positive electrode plate comprises a new positive electrode active material and a new conductive premier layer.

The new positive electrode active materials have achieved better effects in one or even all aspects of cycling performance, high-temperature storage performance and safety performance.

The new conductive undercoat layer achieves better effects in one or even all aspects of providing the adhesive force of the electrode plate, reducing the direct-current resistance of the battery, and improving the cycling performance of the battery.

It should be noted that the present application is not limited to the above embodiments. The above embodiments are exemplary only, and any embodiment that has substantially same constitutions as the technical ideas and has the same effects within the scope of the technical solution of the present application falls within the technical scope of the present application. In addition, without departing from the gist of the present application, various modifications that can be conceived by those skilled in the art to the embodiments, and other modes constructed by combining some of the constituent elements of the embodiments also fall within the scope of the present application.

The invention claimed is:

1. A positive electrode plate, comprising a positive electrode current collector, a positive electrode film layer provided on at least one surface of the positive electrode current collector, and a conductive undercoat layer between the positive electrode current collector and the positive electrode film layer, wherein the positive electrode film layer comprises a positive electrode active material with a core-shell structure; the positive electrode active material comprises an inner core and a shell coating the inner core;

the inner core includes $Li_{1+x}Mn_{1-y}A_yP_{1-z}R_zO_4$, where x=−0.100 to 0.100, y=0.001 to 0.500, z=0.001 to 0.100, A is one or more selected from the group consisting of Zn, Al, Na, K, Mg, Mo, W, Ti, V, Zr, Fe, Ni, Co, Ga, Sn, Sb, Nb and Ge, and R is one or more selected from the group consisting of B, Si, N and S;

the shell includes a first coating layer coating the inner core and a second coating layer coating the first coating layer, wherein the first coating layer includes pyrophosphate of $MP_2O_7$ and phosphate of $XPO_4$, wherein M and X are each independently one or more selected from the group consisting of Li, Fe, Ni, Mg, Co, Cu, Zn, Ti, Ag, Zr, Nb and Al; and the second coating layer includes carbon; and the conductive undercoat layer includes a first polymer, a first water-based binder, and a first conductive agent, wherein the first polymer comprises a first monomer unit represented by formula 1;

a second monomer unit selected from the group consisting of a monomer unit represented by formula 2 and a monomer unit represented by formula 3;

a third monomer unit selected from the group consisting of a monomer unit represented by formula 4 and a monomer unit represented by formula 5; and a fourth monomer unit represented by formula 6, in which $R^1$, $R^2$, and $R^3$ each independently represent one selected from the group consisting of H, a carboxyl, an ester group, and groups of C1-C10 alkyl, C1-C10 alkoxy, C2-C10 alkenyl, and C6-C10 aryl, and $R^4$ represents one selected from the group consisting of H, groups of C1-C10 alkyl, C1-C10 alkoxy, C2-C10 alkenyl, and C6-C10 aryl;

formula 1

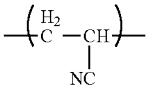

formula 2

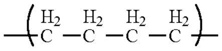

formula 3

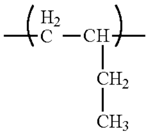

formula 4

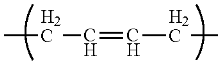

formula 5

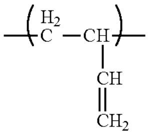

formula 6

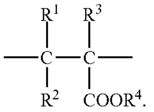

2. The positive electrode plate according to claim 1, wherein based on the total mass of the first polymer, the mass percentage content of the first monomer unit is M1, and M1 is 10%-55%; and/or the mass percentage content of the second monomer unit is M2, and M2 is 40%-80%; and/or the mass percentage content of the third monomer unit is M3, and M3 is 0%-10%; and/or the mass percentage content of the fourth monomer unit is M4, and M4 is 0%-10%.

3. The positive electrode plate according to claim 1, wherein the first polymer has a weight-average molecular weight of 50,000-1,500,000.

4. The positive electrode plate according to claim 1, wherein the first water-based binder includes one or more selected from the group consisting of a water-based polyacrylic resin and a derivative thereof, a water-based amino-modified polypropylene resin and a derivative thereof, and a polyvinyl alcohol and a derivative thereof; and/or the first water-based binder has a weight-average molecular weight of 200,000-1,500,000.

5. The positive electrode plate according to claim 1, wherein the first conductive agent includes one or more selected from the group consisting of superconductive carbon, conductive graphite, acetylene black, carbon black, Ketjen black, carbon dots, carbon nanotubes, graphene, and carbon nanofibers.

6. The positive electrode plate according to claim 1, wherein based on the total mass of the conductive undercoat layer, the mass percentage content of the first polymer is X1, and X1 is 5%-20%; and/or the mass percentage content of the first water-based binder is X2, and X2 is 30%-80%; and/or the mass percentage content of the first conductive agent is X3, and X3 is 10%-50%.

7. The positive electrode plate according to claim 1, wherein the positive electrode film layer further includes one or more selected from the group consisting of an infiltration agent and a dispersant, and the infiltration agent includes one or more selected from a small molecule organic solvent and a low molecular weight polymer, and the small molecule organic solvent includes one or more selected from the group consisting of an alcohol amine compound, an alcohol compound, and a nitrile compound, and the alcohol amine compound has a number of carbon atom of 1-16; and the low molecular weight polymer includes one or more selected from the group consisting of a maleic anhydride-styrene copolymer, polyvinylpyrrolidone, and polysiloxane, and the low molecular weight polymer has a weight-average molecular weight of no more than 6000.

8. The positive electrode plate according to claim 7, wherein the dispersant includes a second polymer, and the second polymer comprises:

a fifth monomer unit represented by formula 7;

a sixth monomer unit selected from the group consisting of a monomer unit represented by formula 8 and a monomer unit represented by formula 9; and a seventh monomer unit selected from the group consisting of a monomer unit represented by formula 10 and a monomer unit represented by formula 11;

formula 7

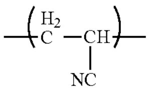

formula 8

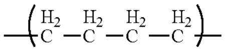

formula 9

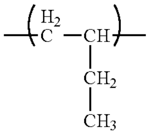

formula 10

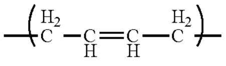

formula 11

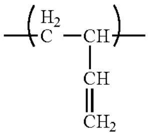
;

based on the total mass of the second polymer, the mass percentage content of the fifth monomer unit is M5, and M5 is 10%-55%; and/or the mass percentage content of the sixth monomer unit is M6, and M6 is 40%-80%; and/or the mass percentage content of the seventh monomer unit is M7, and M7 is 0%-10%.

9. The positive electrode plate according to claim 8, wherein the second polymer has a weight-average molecular weight of 50,000-500,000, based on the total mass of the positive electrode film layer, the mass percentage content of the dispersant is Y1, and Y1 is 0.05%-1%; and/or the mass percentage content of the infiltration agent is Y2, and Y2 is 0.05%-2%.

10. The positive electrode plate according to claim 8, wherein in the positive electrode plate, the mass ratio of the first polymer to the second polymer is 1.5-5.

11. The positive electrode plate according to claim 1, wherein the first coating layer has an interplanar spacing of the phosphate of 0.345-0.358 nm, and an angle of the crystal direction (111) of 24.25°-26.45°; and the first coating layer has an interplanar spacing of the pyrophosphate of 0.293-0.326 nm, and an angle of the crystal direction (111) of 26.41°-32.57°;

in the inner core, the ratio of y to 1-y is 1:10 to 10:1; and/or in the inner core, the ratio of z to 1-z is 1:9 to 1:999; and the coating amount of the first coating layer is greater than 0 wt % and less than or equal to 7 wt % based on the weight of the inner core.

12. The positive electrode plate according to claim 1, wherein the weight ratio of the pyrophosphate to phosphate in the first coating layer is 1:3 to 3:1; the pyrophosphate and the phosphate each independently have a crystallinity of 10% to 100%; the coating amount of the second coating layer is greater than 0 wt % and less than or equal to 6 wt % based on the weight of the inner core, and A is at least two selected from the group consisting of Mg, Ti, V, Fe, Ni and Co.

13. The positive electrode plate according to claim 1, wherein the Li/Mn antisite defect concentration of the positive electrode active material is 4% or less; the lattice change rate of the positive electrode active material is 6% or less; the surface oxygen valence state of the positive electrode active material is −1.98 to −1.88; and the compacted density of the positive electrode active material under 3 ton is 2.0 $g/cm^3$ to 2.8 $g/cm^3$.

14. A secondary battery, comprising a positive electrode plate according to claim 1.

15. A power consuming device, comprising a secondary battery according to claim 14.

* * * * *